(12) United States Patent
Yagi et al.

(10) Patent No.: US 9,176,360 B2
(45) Date of Patent: Nov. 3, 2015

(54) METHOD FOR PRODUCING SPOT-SIZE CONVERTOR

(71) Applicant: SUMITOMO ELECTRIC INDUSTRIES, LTD., Osaka-shi, Osaka (JP)

(72) Inventors: Hideki Yagi, Machida (JP); Naoko Konishi, Yokohama (JP); Takamitsu Kitamura, Fujisawa (JP); Naoya Kono, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/331,762

(22) Filed: Jul. 15, 2014

(65) Prior Publication Data

US 2015/0024527 A1 Jan. 22, 2015

(30) Foreign Application Priority Data

Jul. 17, 2013 (JP) ................................. 2013-148815

(51) Int. Cl.
*H01L 21/00* (2006.01)
*G02F 1/225* (2006.01)
*G02B 6/122* (2006.01)
*G02F 1/21* (2006.01)

(52) U.S. Cl.
CPC ............ *G02F 1/2257* (2013.01); *G02B 6/1228* (2013.01); *G02F 2001/212* (2013.01); *G02F 2001/217* (2013.01)

(58) Field of Classification Search
CPC .............................. G02B 6/1228; G02B 6/305
USPC ................................................ 438/31, 39, 40
See application file for complete search history.

(56) References Cited

U.S. PATENT DOCUMENTS

| | | | |
|---|---|---|---|
| 6,229,947 B1 | 5/2001 | Vawter et al. | |
| 9,023,677 B2 * | 5/2015 | Konishi et al. | 438/69 |
| 2014/0254998 A1 * | 9/2014 | Furuya et al. | 385/131 |
| 2015/0043867 A1 * | 2/2015 | Kono et al. | 385/3 |

* cited by examiner

*Primary Examiner* — Reema Patel
(74) *Attorney, Agent, or Firm* — Smith, Gambrell & Russell LLP.

(57) ABSTRACT

A method for producing a spot-size convertor includes the steps of preparing a substrate; forming a stacked semiconductor layer including first and second core layers on the substrate; forming a mesa structure by etching the stacked semiconductor layer using a first mask, the mesa structure including a side surface and a bottom portion of the first core layer; forming a protective mask covering the side surface; etching the bottom portion using the protective mask to form a top mesa; and forming a bottom mesa by etching the second core layer using a second mask. The top mesa includes the first core layer and a portion having a mesa width gradually reduced in a first direction of a waveguide axis. The bottom mesa includes the second core layer and a portion having a mesa width gradually reduced in a second direction opposite to the first direction.

8 Claims, 20 Drawing Sheets

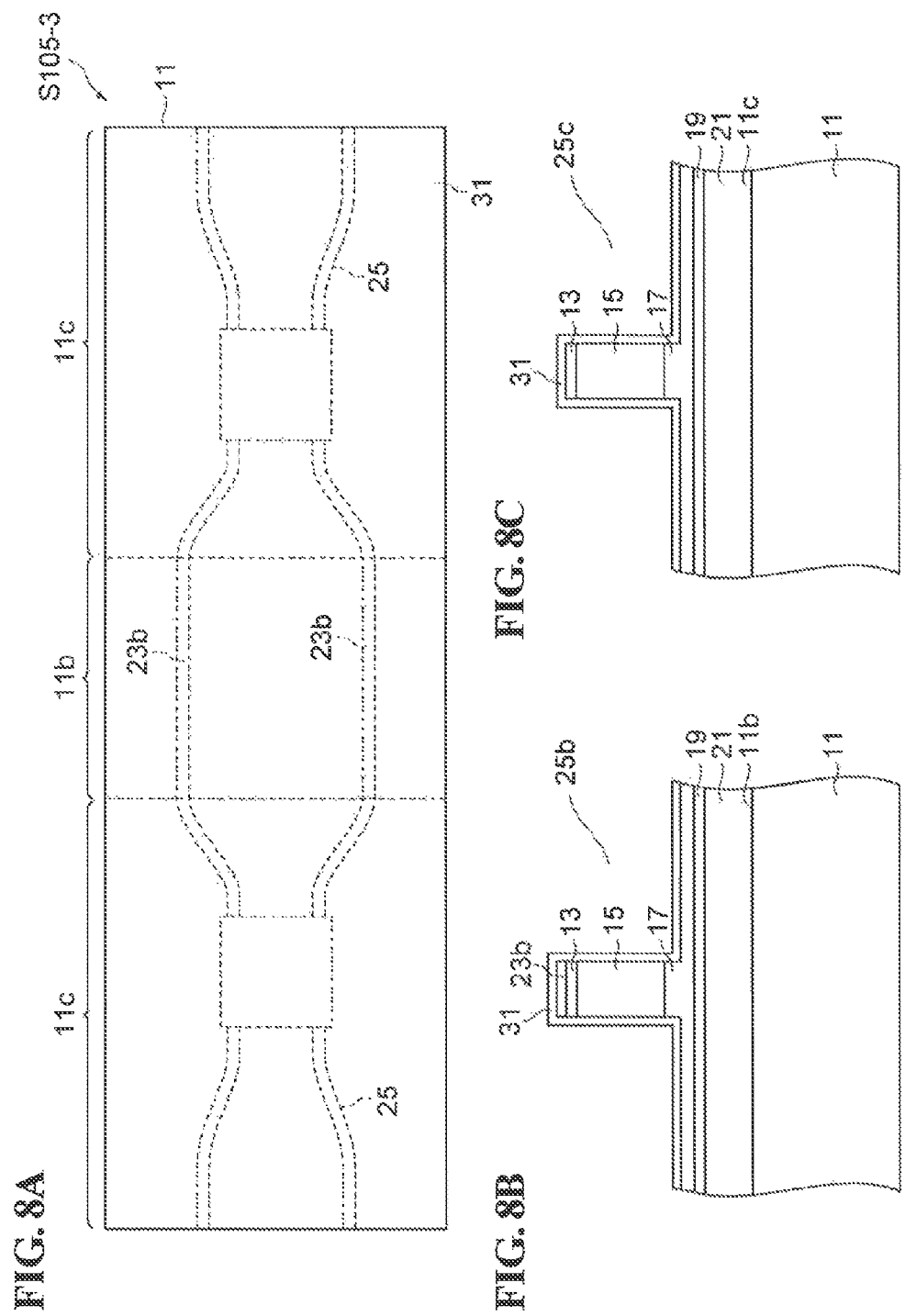

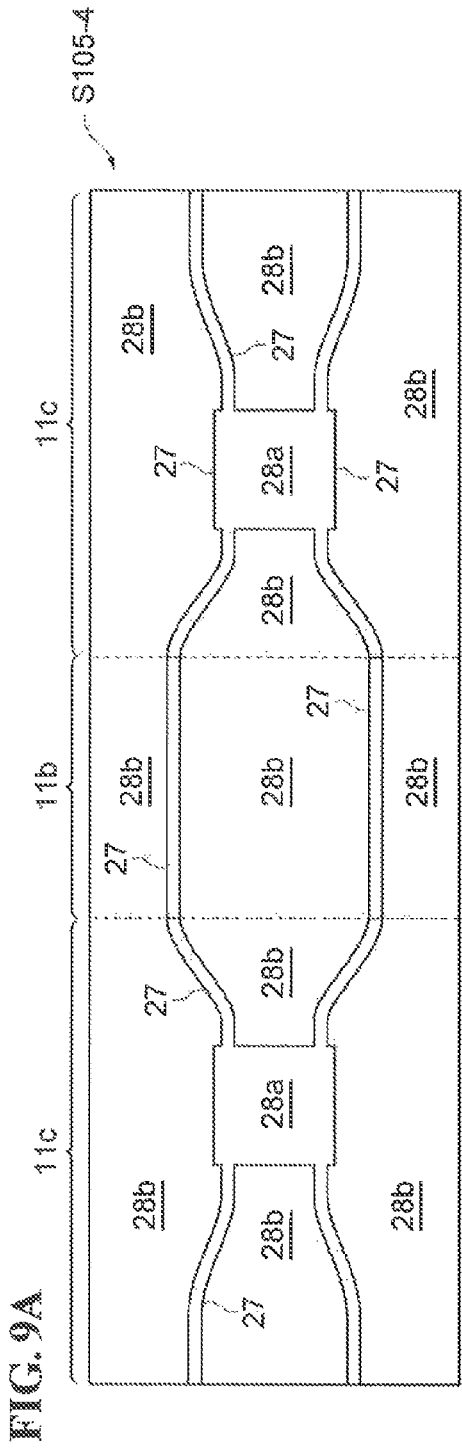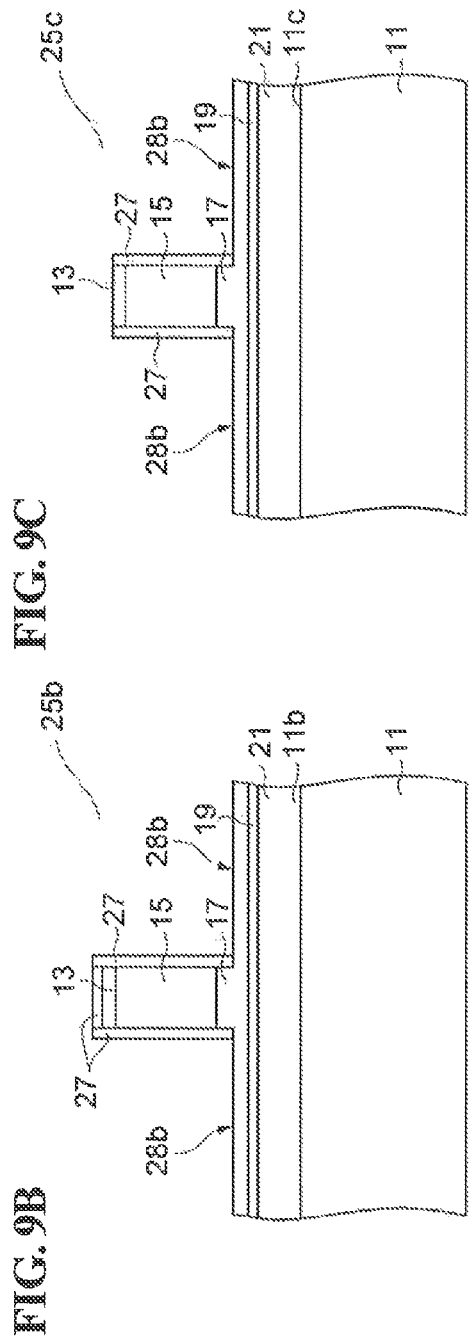

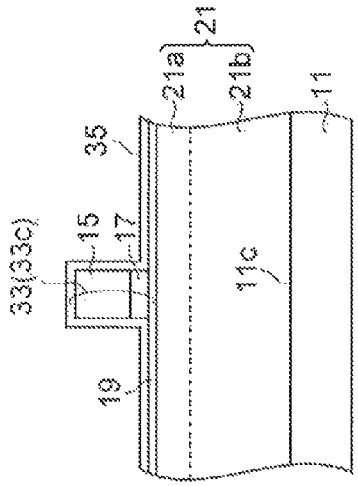
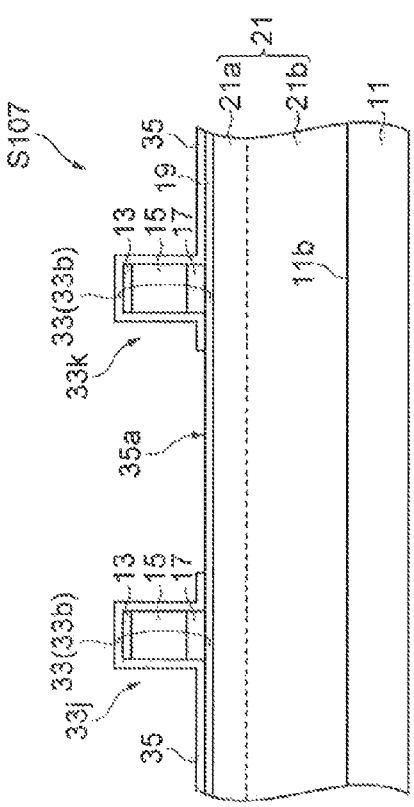

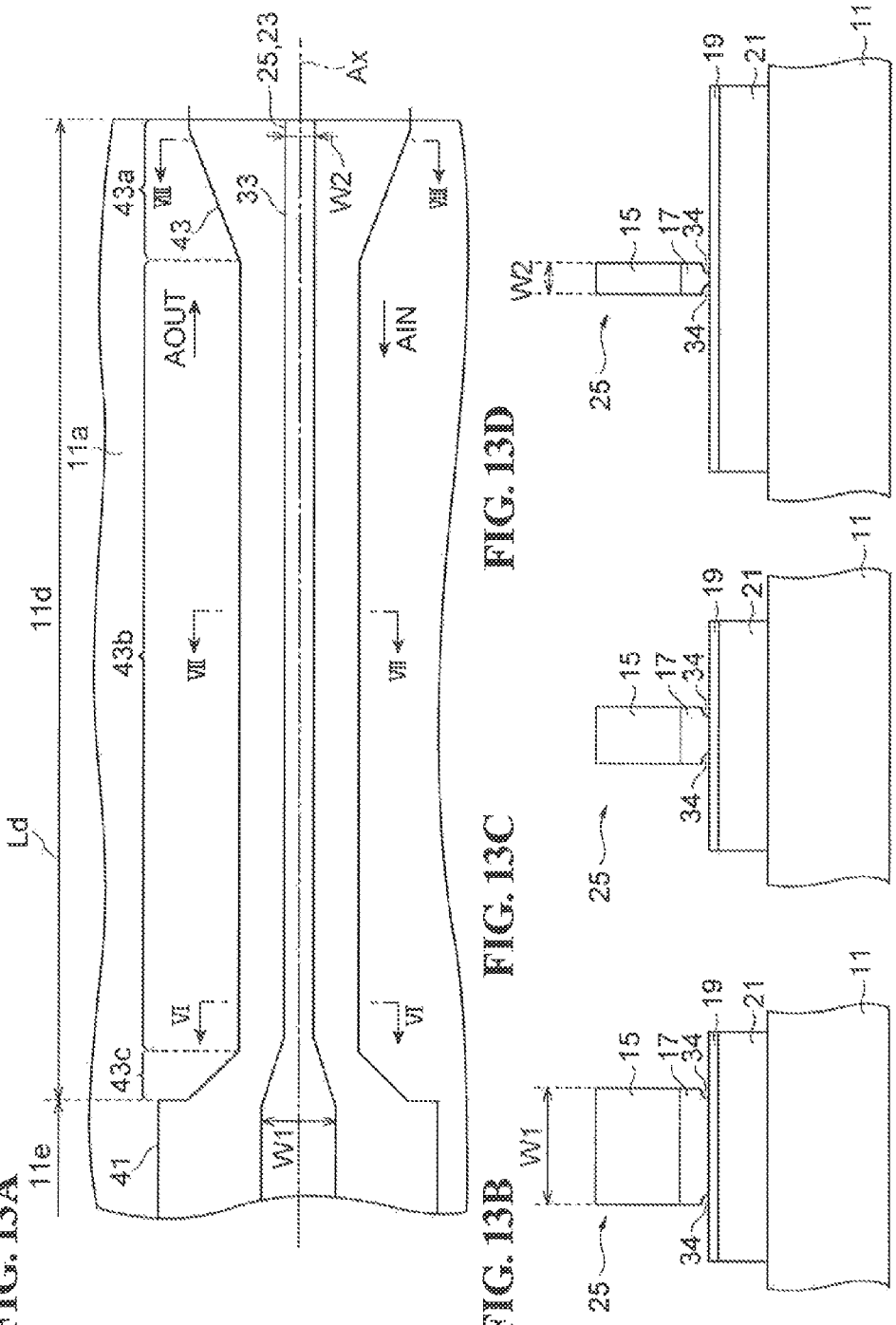

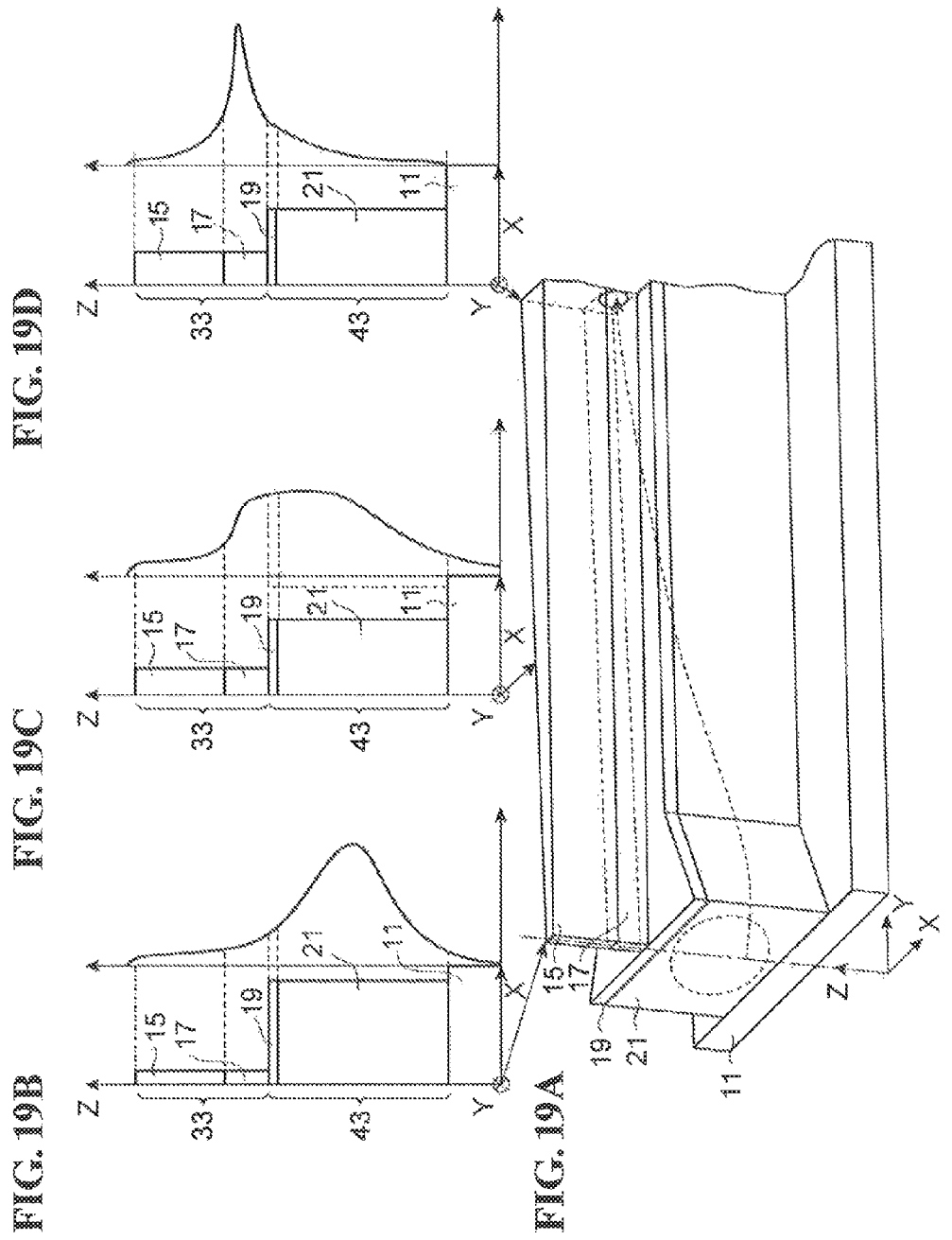

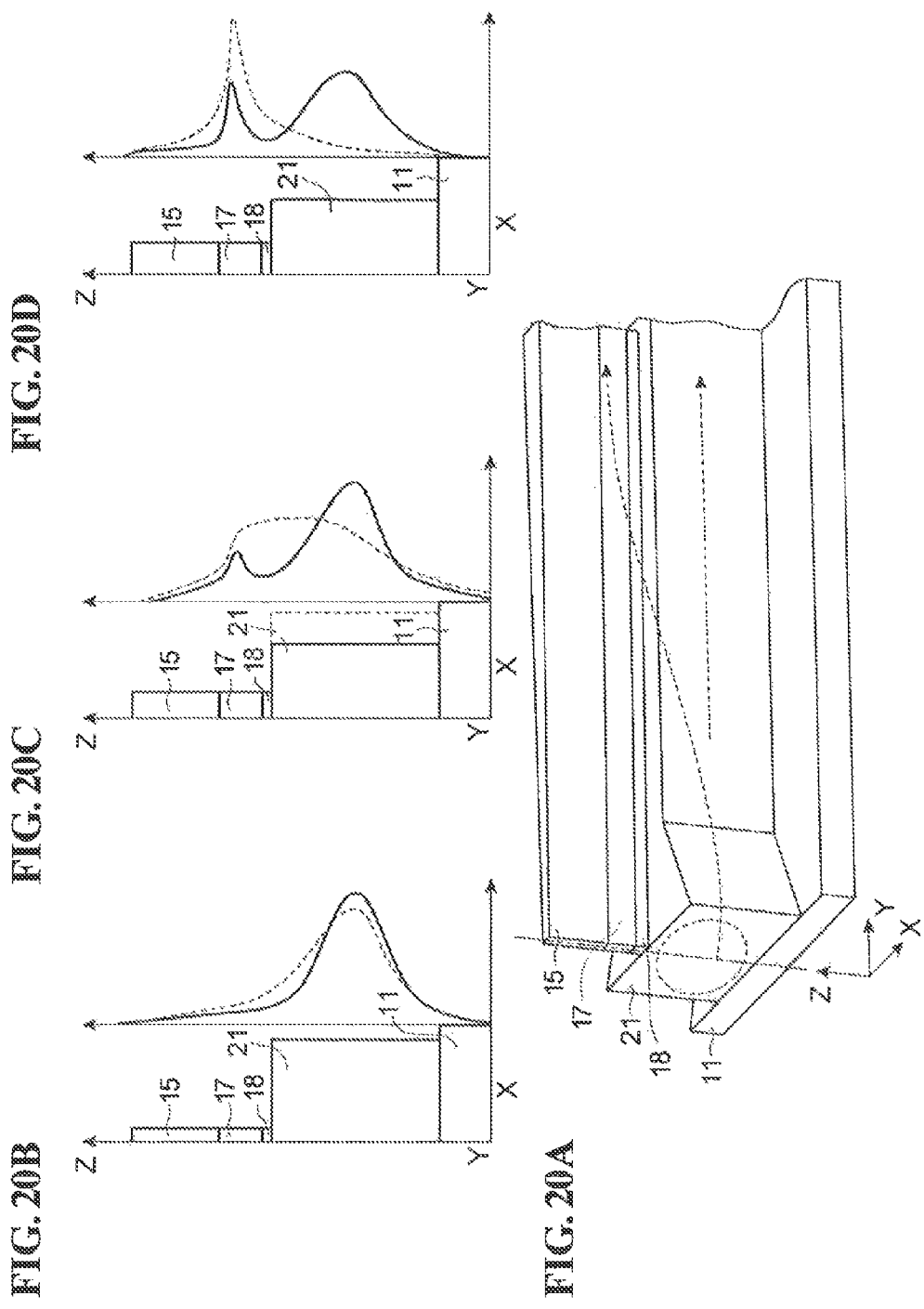

METHOD FOR PRODUCING SPOT-SIZE CONVERTOR

BACKGROUND OF THE INVENTION

1. Field of the Invention

The present invention relates to a method for producing a spot-size convertor.

2. Description of the Related Art

U.S. Pat. No. 6,229,947 discloses a semiconductor optical device and a spot-size convertor of a monolithically integrated tapered rib waveguide type.

The spot-size convertor disclosed in U.S. Pat. No. 6,229,947 includes a top waveguide and a bottom waveguide. The top waveguide and the bottom waveguide are produced by etching of a stacked semiconductor layer. The stacked semiconductor layer includes an upper cladding layer, a first core layer, a separation layer, and a second core layer. The first core layer is included in the top waveguide. The second core layer is included in the bottom waveguide. The separation layer is provided between the first core layer and the second core layer. The spot-size convertor has a region where light transfers from the top waveguide to the bottom waveguide.

SUMMARY OF THE INVENTION

The spot-size convertor disclosed in U.S. Pat. No. 6,229,947, in the region where light transfers from the top waveguide to the bottom waveguide, the upper cladding layer is removed. Consequently, the mode field of the top waveguide and the bottom waveguide are approximately the same. But it is difficult to remove the upper cladding layer of the top waveguide while the first core layer being left. Thus, a method for producing the spot-size convertor disclosed in U.S. Pat. No. 6,229,947 is complicated.

The top waveguide is formed by dry etching. In dry etching, the etch depth of the first core layer is controlled by monitoring the plasma emission intensity. However, there is an in-plane distribution of an etching rate. Namely, the etching rate in the center of a wafer is different from the etching rate in the peripheral region of the wafer. If the etching time is determined based on a high etching rate by plasma monitoring, part of the first core layer is left without being etched. And if the etching time is determined based on a low etching rate by plasma monitoring, the separation layer is etched, thereby a thinning or an elimination of the separation layer occurs. To solve such a problem, it is necessary to establish etching conditions such that a uniform etch depth is obtained in the top waveguide over the entire surface of the wafer.

A method for producing a spot-size convertor according to the present invention includes the steps of (a) preparing a substrate having a principal surface including a first area and a second area; (b) forming a stacked semiconductor layer on the principal surface of the substrate, the stacked semiconductor layer including a cladding layer, a first core layer, a core-separation layer, and a second core layer; (c) forming a first mask on the stacked semiconductor layer; (d) forming a mesa structure on the first area and the second area by etching the stacked semiconductor layer from an upper face of the stacked semiconductor layer to a middle of the first core layer using the first mask as an etching mask, the mesa structure including a side surface and a bottom portion of the first core layer, the mesa structure extending along a waveguide axis; (e) forming a protective mask covering the side surface of the mesa structure; (f) etching the bottom portion of the first core layer using the protective mask to form a top mesa until an upper surface of the core-separation layer is exposed; (g) forming a second mask having a stripe-shaped pattern with a larger width than a mesa width of the top mesa; (h) forming a bottom mesa on the second area by etching the core-separation layer and the second core layer using the second mask. In the second area, the top mesa is located on the bottom mesa. In the second area, the top mesa includes the cladding layer, the first core layer, and a portion having the mesa width gradually reduced in a first direction of the waveguide axis. In the second area, the bottom mesa includes the core-separation layer, the second core layer, and a portion having a mesa width gradually reduced in a second direction opposite to the first direction of the waveguide axis.

According to the method, in the step of forming the mesa structure, the etching is performed from the upper face of the stacked semiconductor layer to the middle of the first core layer using the first mask. The mesa structure includes the upper face of the stacked semiconductor layer, the side faces, and the bottom portion of the first core layer. The bottom portion of the first core layer is exposed on the first area and the second area. The side surfaces of the mesa structure includes portions of the side surfaces of the first core layer and the cladding layer.

The protective mask covers the side surfaces of the mesa structure. The bottom portion of the first core layer is exposed from the protective mask. The bottom portion of the first core layer is etched using the protective mask. The upper face of the core-separation layer is exposed by the etching. After the exposure of the upper face of the core-separation layer, the core-separation layer and the second core layer are etched to form the bottom mesa.

The width of the core-separation layer included in the bottom mesa is larger than the width of the top mesa. The bottom mesa includes the second core layer and the core-separation layer. The refractive index of the core-separation layer is smaller than the average refractive index of the first core layer. The refractive index of the core-separation layer is also smaller than the average refractive index of the second core layer. The core-separation layer is provided between the second core layer of the bottom mesa and the first core layer of the top mesa. Furthermore, the core-separation layer is also provided on the second core layer of the bottom mesa in a region outside the bottom of the top mesa.

A bottom waveguide included in the bottom mesa is optically coupled to an external optical waveguide (for example, an optical fiber) having a larger mode field diameter than the semiconductor waveguide. A top waveguide included in the top mesa is optically coupled to the bottom waveguide. The top waveguide is optically coupled to an active device portion monolithically integrated with the spot-size converter. The core-separation layer is provided along the second core layer of the bottom mesa. Thus, light propagating in the bottom waveguide is distributed over the entire bottom mesa. The light is distributed into the core-separation layer in the bottom mesa. This is because the core-separation layer have a higher refractive index than air. A region where the light is distributed is larger than that in the case where the core-separation layer is included only in the top mesa. In addition, the core-separation layer provided between the bottom mesa and the top mesa facilitates the transition of light between the bottom waveguide and the top waveguide. Almost all light can transfer from the bottom waveguide to the top waveguide, or from the top waveguide to the bottom waveguide.

In the method for producing a spot-size convertor according to the present invention, the stacked semiconductor layer may include a contact layer formed on the cladding layer. The step of forming the protective mask may include the steps of, after the formation of the mesa structure, forming a resist mask having a pattern covering the first mask in the first area of the principal surface, the first mask in second area of the principal surface being exposed through the resist mask; etching the first mask using the resist mask, the first mask on the mesa structure in the first area being left; after the etching of the first mask, forming an insulating film having a first thickness on the mesa structure, the side surface of the mesa structure, and the bottom portion of the first core layer; and etching the insulating film by dry etching so as to form the protective mask disposed on the side surface of the mesa structure. In addition, in the step of etching the bottom portion of the first core layer, the contact layer of the top mesa on the second area of the principal surface may be etched.

According to this method, after the formation of the mesa structure, a portion of the first mask located on the second area of the principal surface, is removed. After the removal of the first mask located on the second area, an insulating film having a first thickness is deposited on the substrate. The insulating film is etched by a thickness corresponding to the first thickness of the insulating film. Thus, the bottom portion of the first core layer and the contact layer on the second area of the mesa structure are exposed from the protective mask. The side surfaces of the mesa structure are covered with the protective mask.

When the bottom portion of the first core layer is etched, the contact layer of the mesa structure on the second area is also etched. The contact layer on the first area is kept without being etched. The contact layer on the first area is used as a contact layer for an electrode of the active device.

In the method for producing a spot-size convertor according to the present invention, in the step of etching the insulating film by dry etching, the insulating film may be etched using an etchant containing fluorocarbon. According to the method, the insulating film is formed on the side surface of the mesa structure as the protective mask by using dry etching method with a fluorocarbon as an etchant. By using the dry etching method, the insulating film on the mesa structure and the bottom portion of the first core layer is etched. On the other hand, the insulating film formed on the side surface of the mesa structure is left without etching because the insulating film is etched anisotropically to the thickness direction in the dry etching process.

In the method for producing a spot-size convertor according to the present invention, the second core layer may have a multi-layer structure including GaInAsP layers and InP layers alternately stacked. The second care layer may include a first portion and a second portion provided between the first portion and the substrate. In addition, the second portion of the second core layer may be doped with an n-type dopant. According to the method, the second portion of the second core layer is used as a contact layer for an electrode of the active device.

In the method for producing a spot-size convertor according to the present invention, the top mesa on the first area may be configured to form a modulation portion as a Mach-Zehnder modulator. The modulation portion may include a first arm waveguide and a second arm waveguide of the Mach-Zehnder modulator. According to the method, as the contact layer of the top mesa on the first area being left, the top mesa on the first area is used for the modulation portion of the Mach-Zehnder device.

In the method for producing a spot-size convertor according to the present invention, the second core layer may have a multi-layer structure including GaInAsP layers and InP layers alternately stacked. The second core layer may include a first portion and a second portion provided between the first portion and the substrate. The second portion of the second core layer may be doped with an n-type dopant. The method may further include the steps of, after the formation of the top mesa, forming a contact mask having an opening located between the first arm waveguide and the second arm waveguide on the first area of the principal surface of the substrate; forming a contact opening by etching the first portion of the second core layer and the core-separation layer using the contact mask; and forming a first electrode located on the top mesa on the first area and a second electrode located in the contact opening.

According to the method, the second core layer includes the second portion containing the n-type dopant. The core-separation layer and the first portion of the second core layer are etched with the contact mask. Thus, the contact opening is formed. The first electrode disposed on the top mesa and the second electrode disposed in the contact opening is used as the electrodes for the Mach-Zehnder device.

In the method for producing a spot-size convertor according to the present invention, the step of forming the bottom mesa on the second area may include a step of forming an element-isolation mesa in the first area at the time of the etching of the second core layer. According to the method, the element-isolation mesa is formed by the etching of the second core layer for the formation of the bottom mesa. Thus, a plurality of active devices on the substrate are electrically isolated from each other.

In the method for producing a spot-size convertor according to the present invention, the first core layer may have a multi-quantum-well structure including quantum well layers made of AlGaInAs and barrier layers made of AlGaInAs alternately stacked. The core-separation layer may be made of InP. The core-separation layer may cover an upper face of the second core layer of the bottom mesa. According to the method, the first core layer is selectively etched by using wet etching method. In this etching, the core-separation layer composed of InP serves as an etch stop layer.

BRIEF DESCRIPTION OF THE DRAWINGS

FIGS. 8A, 8B, and 8C illustrate main steps in the method for producing a spot-size convertor according to the embodiment.

FIGS. 9A, 9B, and 9C illustrate main steps in the method for producing a spot-size convertor according to the embodiment.

FIGS. 11A, 11B, and 11C illustrate main steps in the method for producing a spot-size convertor according to the embodiment.

FIGS. 13A, 13B, 13C, and 13D illustrate mains step in the method for producing a spot-size convertor according to the embodiment.

FIGS. 19A, 19B, 19C, and 19D illustrate an example according to the embodiment.

FIGS. 20A, 20B, 20C, and 20D illustrate a spot-size convertor having a different structure from the example of the spot-size convertor according to the embodiment.

DESCRIPTION OF THE PREFERRED EMBODIMENTS

Figure 1:
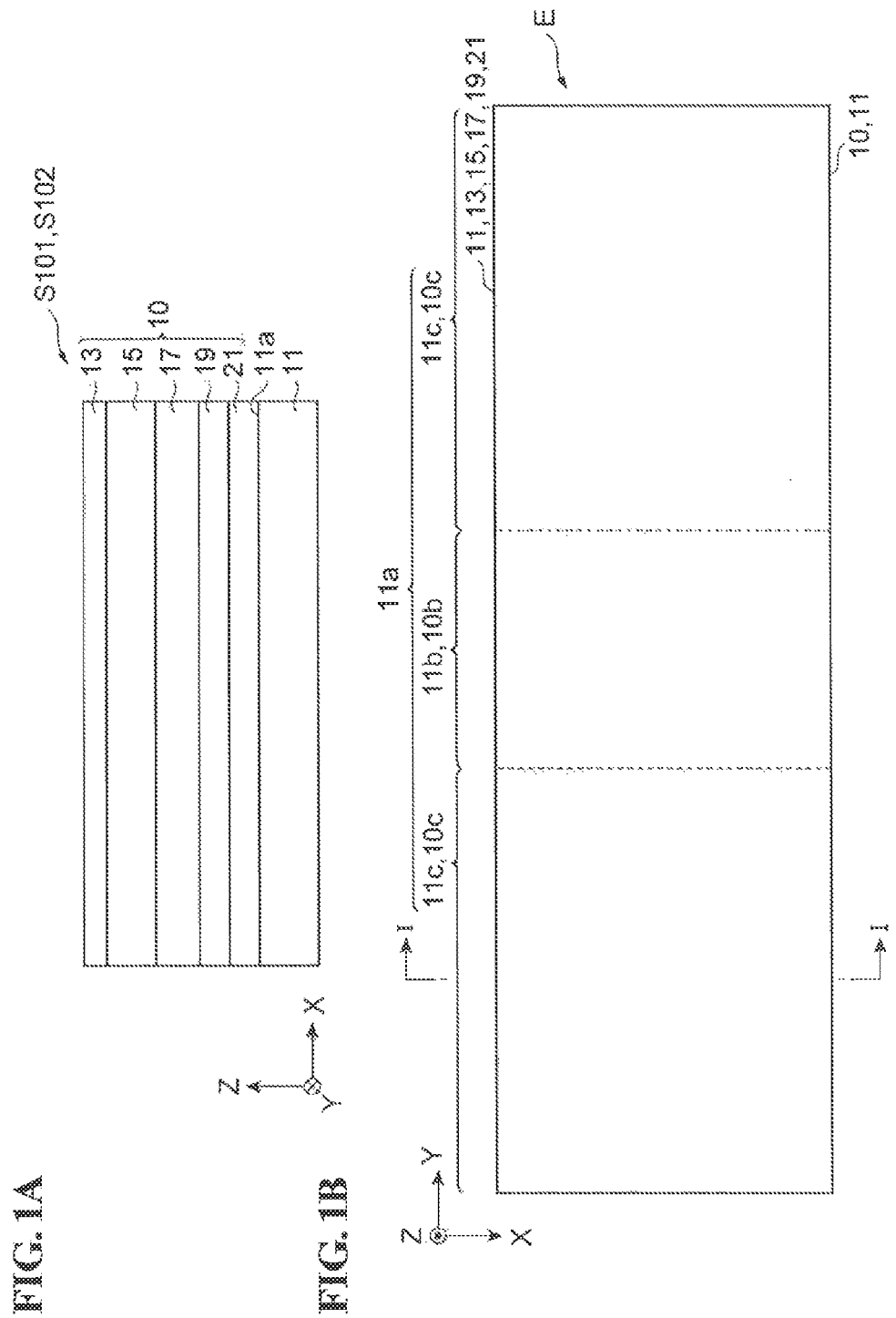
FIGS. 1A and 1B illustrate main steps in a method for producing a spot-size convertor according to an embodiment.

A method for producing a spot-size convertor according to an embodiment of the present invention will be described in detail below with reference to the attached drawings. In the description of the drawings, the same elements are designated using the same reference numerals, and redundant descriptions are not repeated.

FIGS. 1A to 18B illustrate main steps in the method for producing a spot-size convertor according to an embodiment of the present invention. In step S101, a substrate 11 is prepared. The substrate 11 is composed of a III-V group compound semiconductor and is, for example, an InP substrate. The substrate has a principal surface 11a.

In step S102, a stacked semiconductor layer 10 is grown on the principal surface 11a of the substrate 11 by using an organo-metallic vapor phase epitaxy (OMVPE) method, for example, as illustrated in FIGS. 1A and 1B. The stacked semiconductor layer 10 includes a contact layer 13, a cladding layer 15, a first core layer 17, a core-separation layer 19, and a second core layer 21. These semiconductor layers are composed of III-V group compound semiconductors. As a result of this growth, an epitaxial substrate E is formed. The epitaxial substrate E includes the substrate 11 and the stacked semiconductor layer 10. The second core layer 21, the core-separation layer 19, the first core layer 17, and the cladding layer 15 are arranged in that order on the principal surface 11a of the substrate 11. FIG. 1B illustrates an area including an element on a wafer. FIG. 1A is a cross-sectional view taken along line I-I in FIG. 1B. In FIGS. 1A and 1B, Cartesian coordinate systems S are indicated. The principal surface 11a extends along a plane defined by the X-axis and the Y-axis. The contact layer 13, the cladding layer 15, the first core layer 17, the core-separation layer 19, and the second core layer 21 are arranged in that order in the direction of the Z-axis (in the direction normal to the principal surface 11a).

An example of the stacked semiconductor layer 10 is described below.
substrate 11: InP wafer (InP substrate)
contact layer 13: $p^+$-type GaInAs semiconductor layer
cladding layer 15: p-type InP semiconductor layer
first core layer 17: i-type AlGaInAs multi-quantum-well structure
core-separation layer 19: n-type InP semiconductor layer
second core layer 21: n-type GaInAsP/n-type InP multi-layer structure As illustrated in FIGS. 1A and 1B, the principal surface 11a of the substrate 11 has a first area 11b and a second area 11c. A first portion 10b and a second portion 10c of the stacked semiconductor layer 10. The first portion 10b is provided on the first area 11b and the second portion 10c is provided on the second area 11c. In the subsequent steps, a waveguide configured to form a spot-size convertor is formed in the second area 11c of the principal surface 11a. In the subsequent steps, the waveguide of the spot-size convertor is formed also in the second portion 10c of the stacked semiconductor layer 10. In the subsequent steps, an active device is formed in the first area 11b of the principal surface 11a. In the subsequent steps, the active device is formed also in the first portion 10b of the stacked semiconductor layer 10. The active device is optically coupled to the waveguide of the spot-size convertor. In this embodiment, for example, a Mach-Zehnder modulator is produced as an active device in the subsequent steps.

Figure 2:
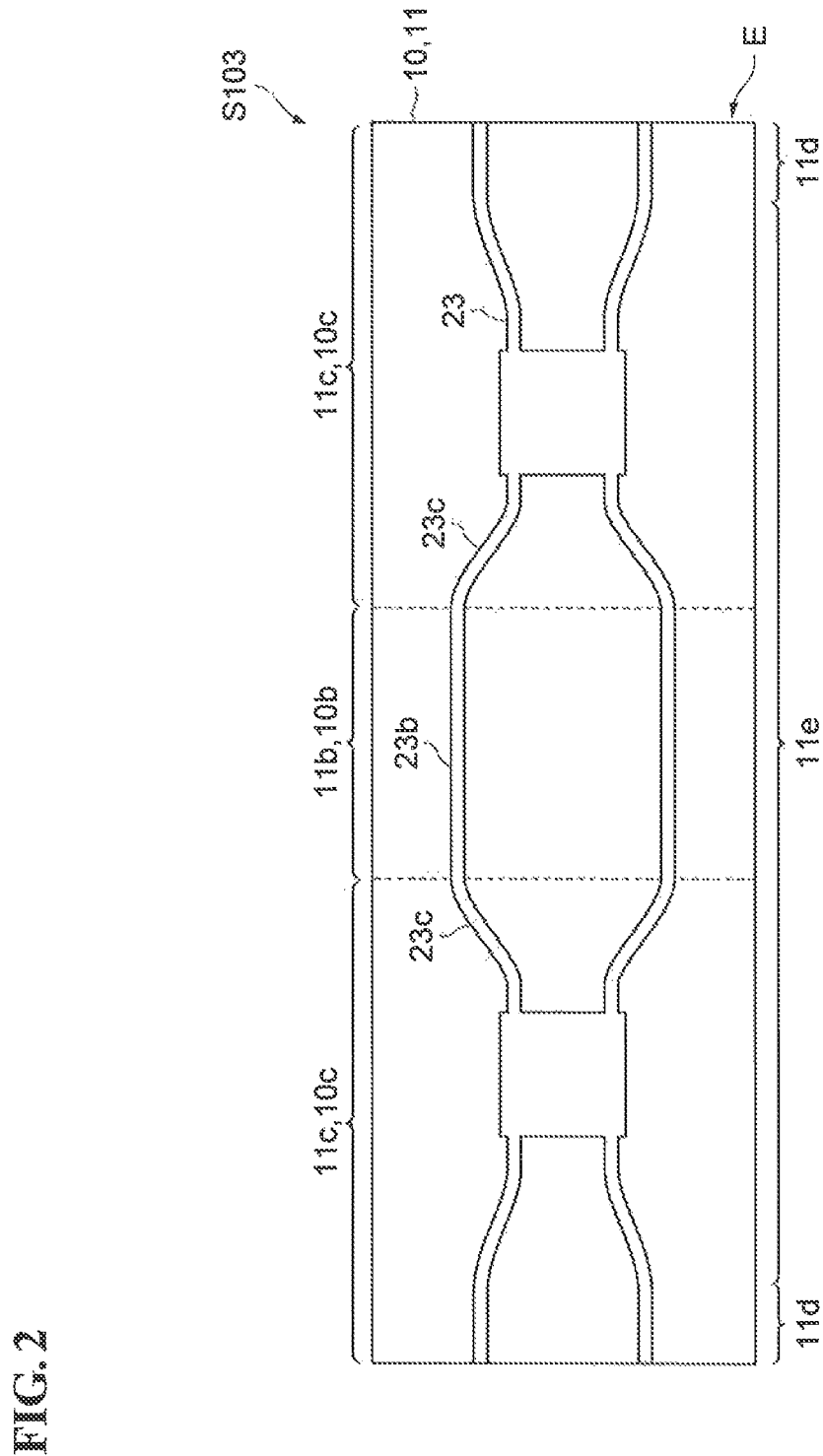
FIG. 2 illustrates a main step in the method for producing a spot-size convertor according to the embodiment.

In step S103, a first mask 23 is formed on the epitaxial substrate E as illustrated in FIG. 2. To form the first mask 23, an insulating film, such as silicon nitride film, is deposited on the epitaxial substrate E. This deposition is performed by, for example, a chemical vapor deposition (CVD) method. A resist mask is formed on the insulating film. The resist mask has a pattern for the formation of a waveguide of the spot-size convertor. The resist mask also has a pattern for the formation of a waveguide of a Mach-Zehnder modulator. The insulating film is etched with the resist mask, thereby forming the first mask 23. The first mask 23 includes a first pattern 23b located above the first area 11b and a second pattern 23c located above the second area 11c. The second pattern 23b has patterns for a first and a second arms included in the Mach-Zehnder modulator. The first pattern 23c has a pattern of the waveguide of the spot-size converter. The second pattern 23c further has patterns for a first 2×2 MMI coupler and a second 2×2 MMI coupler included in the Mach-Zehnder modulator. The second pattern 23c further has a pattern for an input waveguide connected to the first 2×2 MMI coupler. The second pattern 23c further has a pattern for a output waveguide connected to the second 2×2 MMI coupler. The principal surface 11a includes a first portion 11d where the spot-size convertor is provided. The principal surface 11a further includes a second portion 11e where the Mach-Zehnder modulator is provided.

Figure 3:
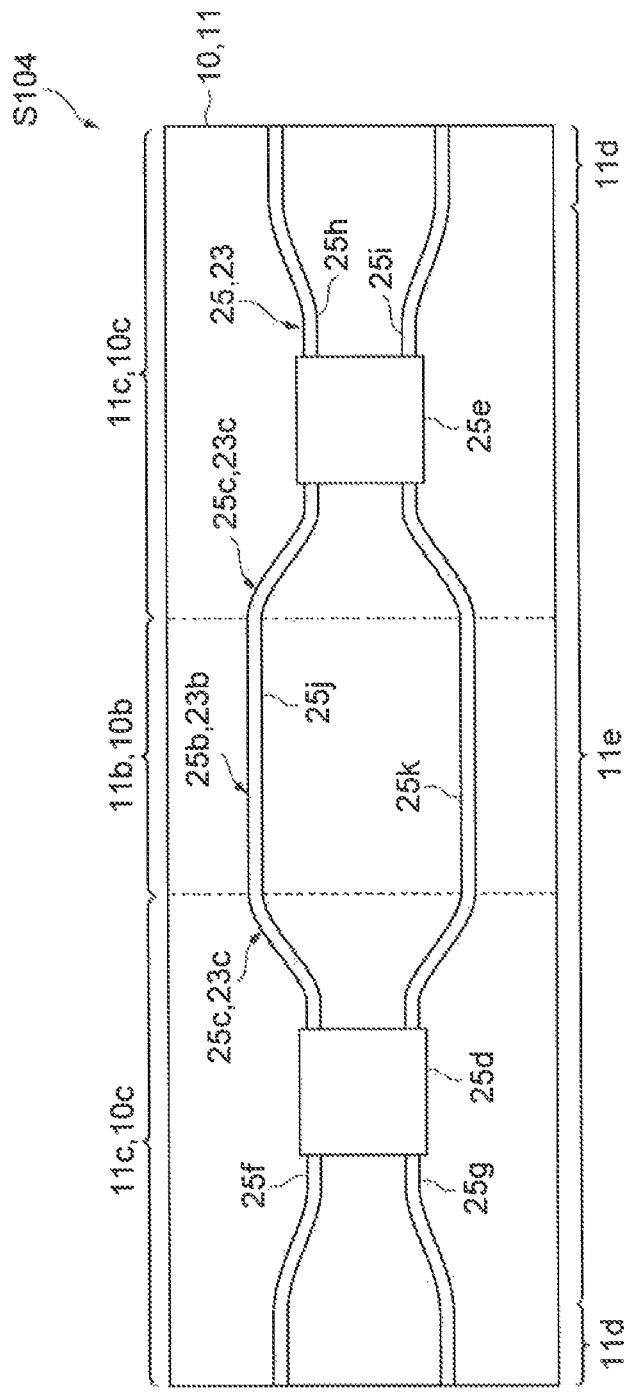
FIG. 3 illustrates a main step in the method for producing a spot-size convertor according to the embodiment.

In step S104, as illustrated in FIG. 3, the stacked semiconductor layer 10 is etched with the first mask 23 from the upper face of the stacked semiconductor layer 10 to the middle of the first core layer 17. A mesa structure 25 is formed on the first and second areas 11c and 11b of the principal surface 11a. The mesa structure 25 includes a first mesa structure 25b located on the first area 11b; and a second mesa structure 25c located on the second area 11c. The mesa structure 25 includes, for example, a first MMI mesa structure 25d configured to form the first 2×2 MMI coupler; and a second MMI mesa structure 25e configured to form the second 2×2 MMI coupler. The mesa structure 25 further includes, for example, a first mesa structure 25f and a second mesa structure 25g connected to the input side of the first 2×2 MMI mesa structure 25d; and a third mesa structure 25h and a fourth mesa structure 25i connected to the output side of the second 2×2 MMI mesa structure 25e. The mesa structure 25 further includes a first arm mesa structure 25j and a second arm mesa structure 25k connected between the MMI mesa structures. In this embodiment, the first mask 23 is not removed even after the formation of the mesa structure 25.

Figure 4A:
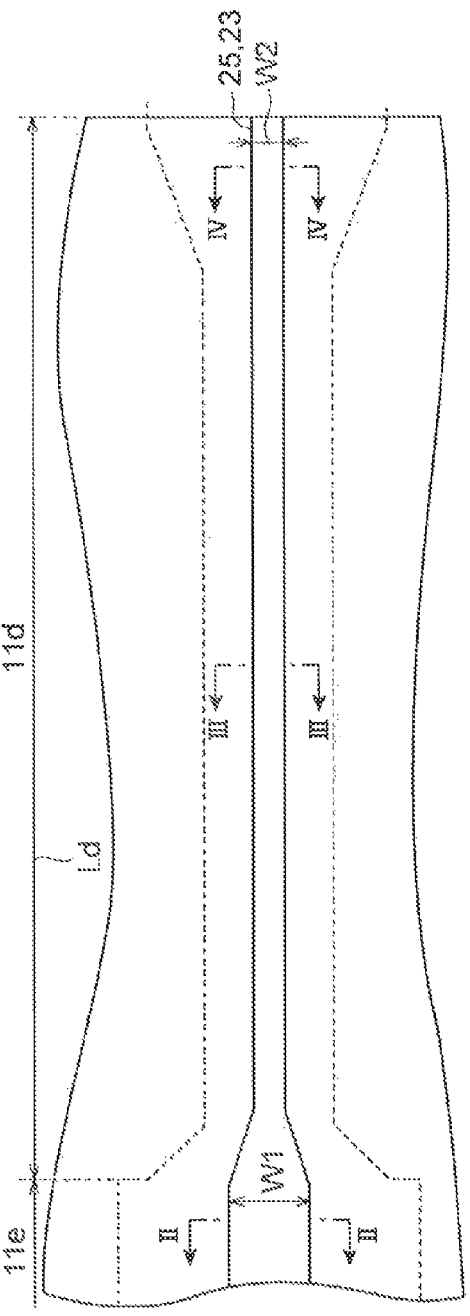
FIGS. 4A, 4B, 4C, and 4D illustrate main steps in the method for producing a spot-size convertor according to the embodiment.
Figure 4B:
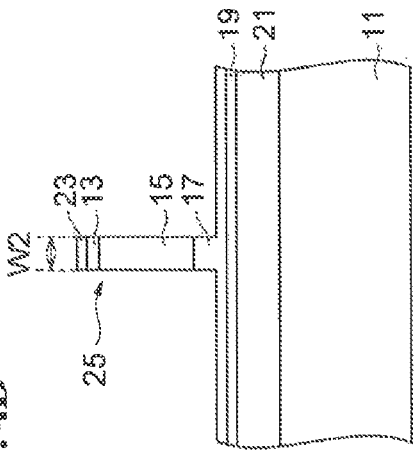
Figure 4C:
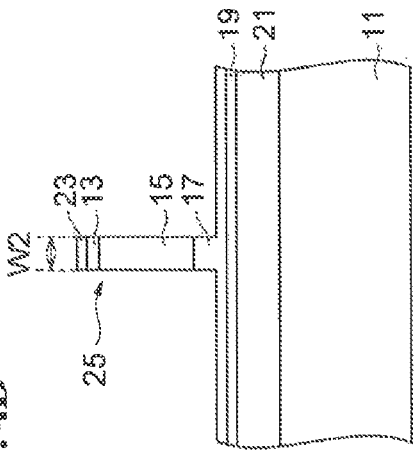
Figure 4D:
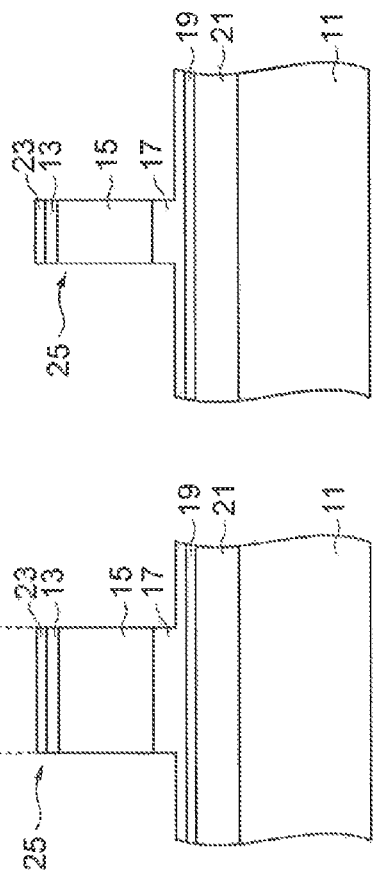

FIGS. 4A to 4D illustrate a waveguide structure for the spot-size convertor. FIG. 4A is a plan view of the spot-size converter. FIGS. 4B, 4C, and 4D are cross-sectional views taken along lines II-II, and III-III, respectively, in FIG. 4A. As illustrated in FIG. 4A, a waveguide structure configured to form the spot-size convertor is formed on the first portion 11d of the principal surface 11a. Regarding the mesa structure 25, the width of the mesa structure 25 at a position of a facet of the spot-size convertor is defined as W2. The width of the mesa structure 25 at a position where the spot-size convertor is connected to the semiconductor waveguide on the second portion 11e is defined as W1. In the mesa structure 25, the width W2 is smaller than the width W1. In the spot-size convertor, the width W1 is, for example, 1.5 to 2.5 µm. The width is selected such that a single-mode waveguide is achieved with respect to light having a wavelength of, for example, 1.53 to 1.57 µm. In this embodiment, the width of the mesa structure 25 on the first portion 11d is gradually reduced from the facet toward the semiconductor waveguide on the second portion 11e. In an embodiment, the width W1 of the waveguide in the spot-size convertor is 2 µm. The width W2 of the waveguide at a position is, for example, 5 µm. The length Ld of the mesa structure 25 on the first portion 11d is, for example, 700 µm. The mesa structure 25 has a height of, for example, about 2 µm. In the formation of the mesa structure 25, variations in etch depth are preferably in the range of −0.1 µm to +0.1 µm with respect to a target value. Broken lines in FIG. 4A indicate a bottom mesa and an element isolation mesa.

Figure 5A:
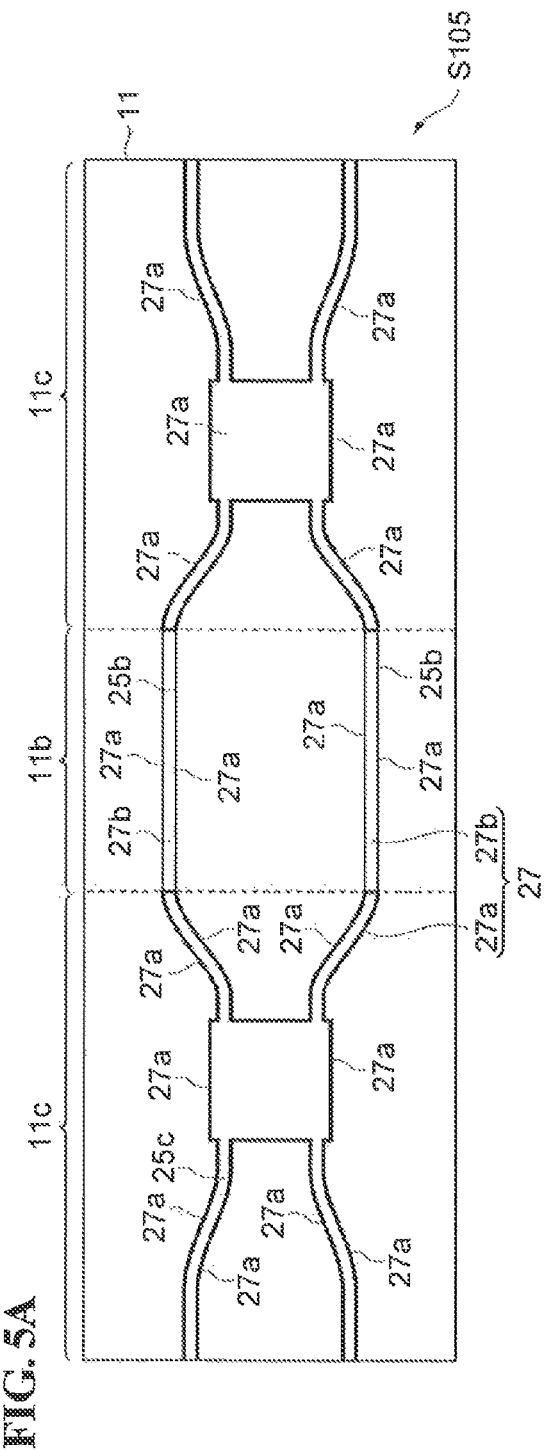
FIGS. 5A, 5B, and 5C illustrate main steps in the method for producing a spot-size convertor according to the embodiment.
Figure 5B:
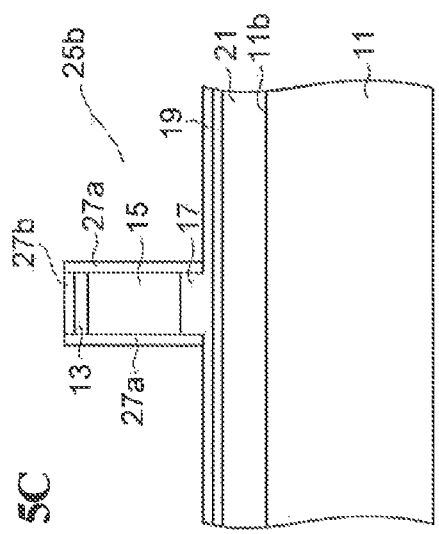
Figure 5C:
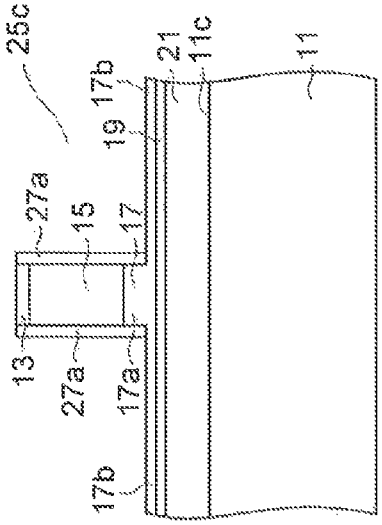

In step S105, a protective mask 27 is formed as illustrated in FIGS. 5A to 5C. FIG. 5A is a plan view of the protective mask 27. FIGS. 5B and 5C are sectional views in the second area 11c and in the first area 11b, respectively. As illustrated in FIGS. 5B and 5C, the mesa structure 25 includes a mesa portion 17a of the first core layer 17, the cladding layer 15, and the contact layer 13. The mesa structure 25 is located on a bottom portion 17b of the first core layer 17. As illustrated in FIG. 5A, the protective mask 27 covers side surfaces of the mesa structure 25 (side surfaces of the first core layer 17) in the first and second area 11b and 11c. The protective mask 27 also covers the upper face of the mesa structure 25 in the first area 11b. The protective mask 27 has an opening on the upper face of the mesa structure 25 (contact layer 13) in the second area 11c. The protective mask 27 has an opening communicating with an exposed surface of the bottom portion 17b of the first core layer 17 above the first area 11b and the second area 11e. As illustrated in FIGS. 5B and 5C, side portions 27a of the protective mask 27 are provided on the side surfaces of the mesa structure 25. The top portion of 27b of the protective mask 27 is provided on the upper face of the mesa structure 25. The protective mask 27 is formed of an insulating film.

Figure 6:
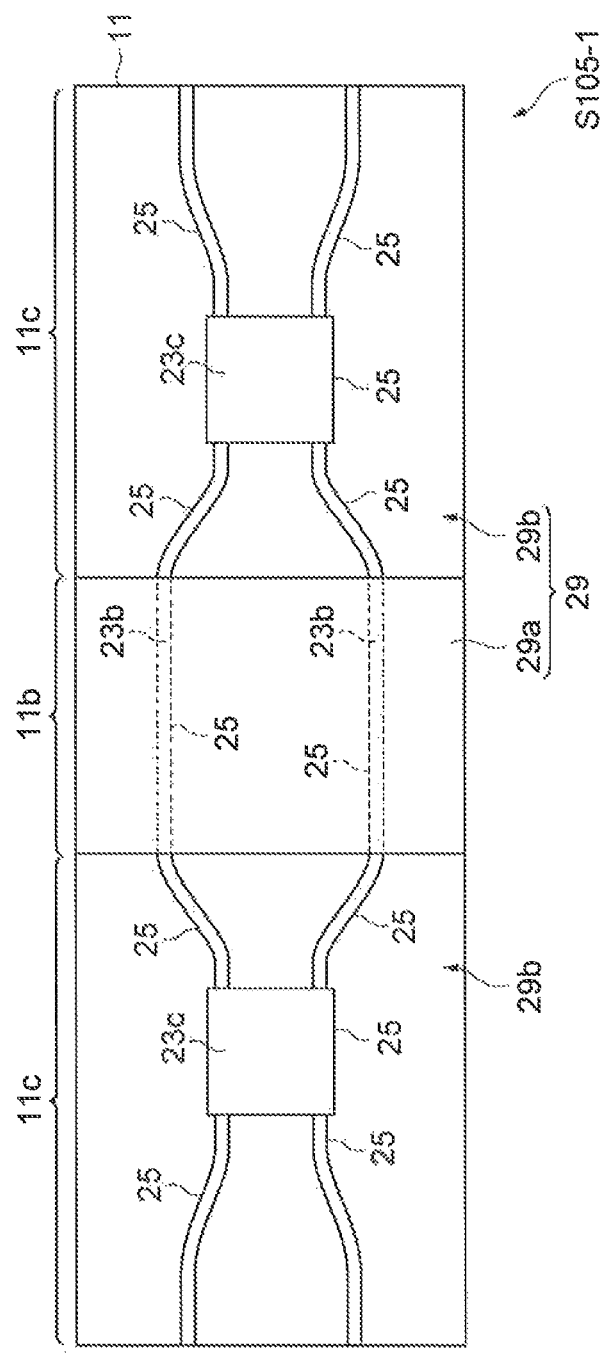
FIG. 6 illustrates a main step in the method for producing a spot-size convertor according to the embodiment.

A method for forming the protective mask 27 according to an embodiment of the present invention will he described below. In step S105-1, a mask 29 is formed on the substrate 11, on the upper face of the mesa structure 25, on the side surfaces of the mesa structure 25, and on the first mask 23. As illustrated in FIG. 6, the mask 29 has a pattern 29a above the first area 11b of the principal surface 11a. The mask 29 has an opening 29b above the second area lie of the principal surface 11a. The mask 29 is composed of, for example, a resist. The mesa structure 25 has a first portion on the first area 11b and has a second portion on the second area 11c. The first mask 23 includes the first pattern 23b located above the first area 11b; and the second pattern 23c located above the second area 11c. The first pattern 23b of the first mask 23 is located on the upper face of the first portion of the mesa structure 25. The second pattern 23c of the first mask 23 is located on the upper face of the second portion of the mesa structure 25.

Figure 7A:
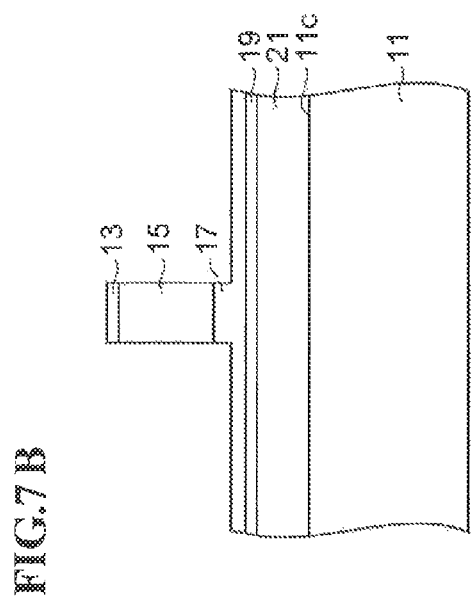
FIGS. 7A, 7B, and 7C illustrate main steps in the method for producing a spot-size convertor according to the embodiment.
Figure 7B:
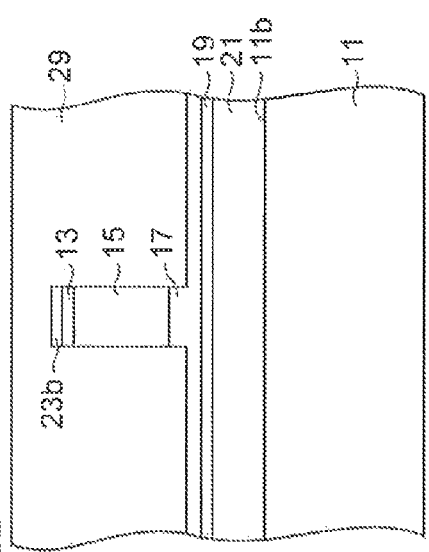
Figure 7C:
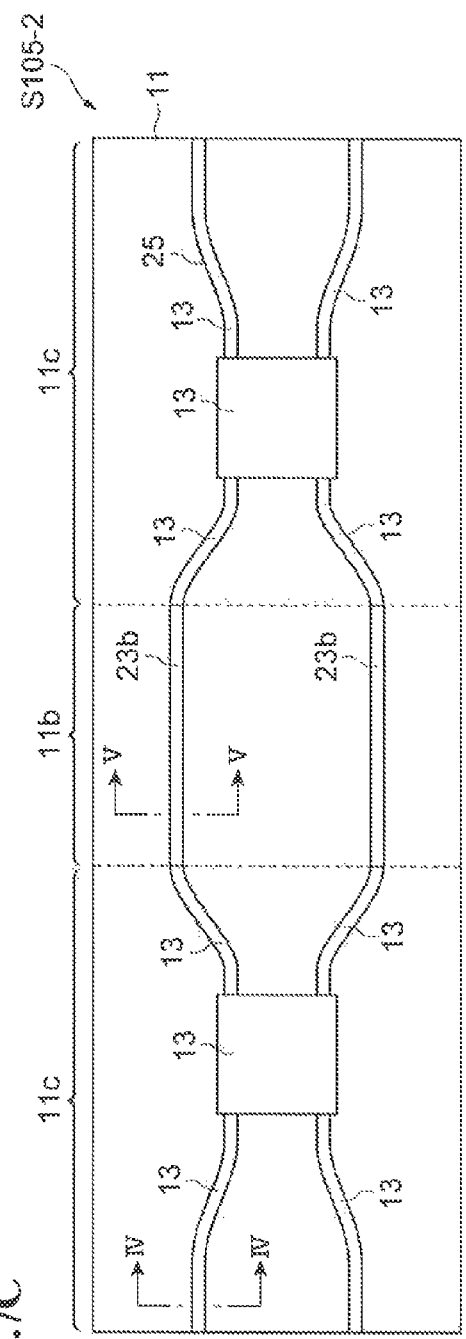

In step S105-2, the first mask 23 is etched using the mask 29, in this etching, buffered hydrofluoric acid (BHF) is used, for example. FIG. 7C illustrates the plan view of the mask 29. FIGS. 7A and 7B are cross-sectional views taken along lines V-V and IV-IV in FIG. 7C. After the etching of the first mask 23, the first pattern 23b of the first mask 23 is left on the first area 11b as illustrated in FIGS. 7A and 7B. After this etching, the mask 29 is removed as illustrated in FIG. 7C.

In step S105-3, an insulating film 31 is deposited on the substrate 11 as illustrated in FIGS. 8A to 8C. As illustrated in FIG. 8A, the insulating film 31 is deposited over the entire surface of the substrate 11. The insulating film 31 has a first thickness of for example, 0.4 µm. The insulating film 31 is composed of, for example, SiN. FIGS. 8B and 8C are cross-sectional views of the first mesa structure 25b and the second mesa structure 25c. The first mesa structure 25b is disposed on the first area 11b. The second mesa structure 25c is disposed on the second area 11e. As illustrated in FIG. 8B, the first pattern 23b is left on the first mesa structure 25b. The insulating film 31 covers the first pattern 23b of the first mask 23 and side surfaces of the first mesa structure 25b on the first area 11b. As illustrated in FIG. 8C, the insulating film 31 covers side surfaces and the upper face of the second mesa structure 25c on the second area 11c.

In step S105-4, the insulating film 31 is etched to them the protective mask 27 as illustrated in FIGS. 9A to 9C, anisotropic etching, such as anisotropic dry etching, is used. On the first area 11b, the side surfaces and the upper face of the first mesa structure 25b are covered with the protective mask 27. On the second area 11c, the upper face of the second mesa structure 25c is exposed from the protective mask 27. On the second area 11c, the side surfaces of the second mesa structure 25c is covered with the protective mask 27. On the first and second areas of 11b and 11c, the upper face of the bottom portion 17b of the first core layer 17 is exposed from the protective mask 27. The protective mask 27 is used when the bottom portion 17b of the first core layer 17 is etched.

On the second area 11c, the protective mask 27 has an opening 28a on the upper face of the mesa structure 25. Both on the first area 11b and the second area 11c, the protective mask 27 has an opening 28b on the bottom portion 17b of the first core layer 17. In FIG. 9A, "28a" and "28b" indicate that the surface of the bottom portion 17b is exposed through openings 28a and 28b.

According to this production method, after the formation of the mesa structure 25, the second pattern 23c of the first mask 23 used to form the mesa structure 25 is removed. After the removal, the insulating film 31 having the first thickness is deposited on the substrate 11. Etching is performed by an amount corresponding to the first thickness of the insulating film 31. This results in the exposure of the upper face of the bottom portion 17b of the first core layer 17 and the upper face of the second portion of the mesa structure 25c. In the first area 11b, the insulating film serving as the protective mask 27 is left on the side surfaces and the upper face of the mesa structure 25. In the second area 11c, the insulating film serving as the protective mask 27 is left on the side surfaces of the mesa structure 25.

In the anisotropic dry etching in step S105-4, a fluorocarbon-containing etchant is used. The insulating film 31 serving as the protective mask 27 on the side surfaces of the mesa structure 25 is kept without being etched when a fluorocarbon gas, such as $CF_4$ gas, is preferably used.

Figure 10A:
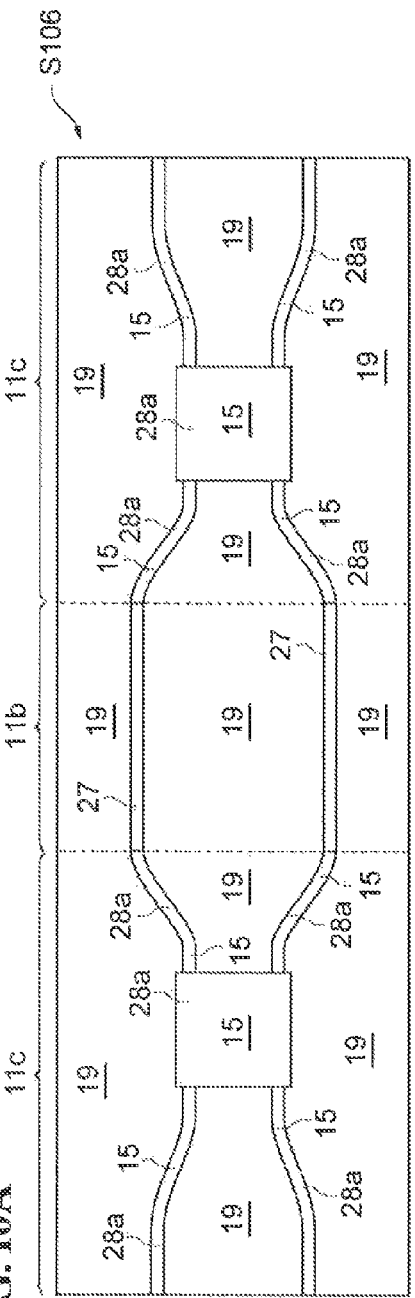
FIGS. 10A, 10B, and 10C illustrate main steps in the method for producing a spot-size convertor according to the embodiment.
Figure 10C:
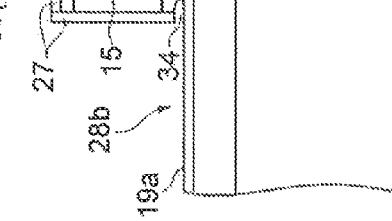
Figure 10B:
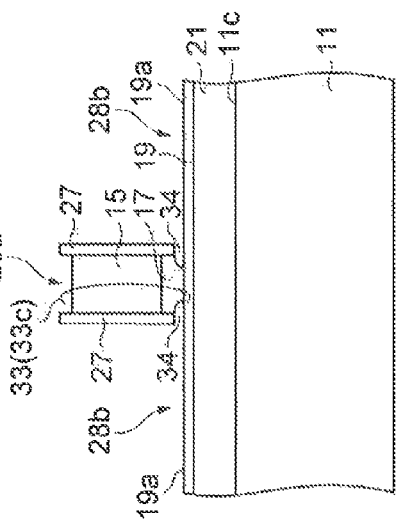

In step S106, the bottom portion 17b of the first core layer 17 is etched using the protective mask 27 as illustrated in FIGS. 10A to 10C. As a result, an upper face 19a of the core-separation layer 19 is exposed. As illustrated in FIGS. 10B and 10C, a top mesa 33 is formed by this etching. A top mesa 33b above the first area 11b is configured to form a modulation portion of the Mach-Zehnder modulator. The uppermost semiconductor layer on the top mesa 33b in the first area 11b is kept without being etched. The uppermost semiconductor layer is used as a contact layer for an electrode of an active device, such as the Mach-Zehnder modulator.

In step S106, the contact layer 13 in the mesa structure 25 on the second area 11c is removed as illustrated in FIG. 10B. A top mesa 33c does not include the contact layer 13. The top mesa 33c is used for a waveguide of the Mach-Zehnder modulator. The top mesa 33c is also used for a waveguide of the spot-size convertor. The top mesa 33b including the contact layer 13. The top mesa 33b is used for a waveguide of an active portion of the Mach-Zehnder modulator. The width of the core-separation layer 19 in the second area 11c is larger than the width of the first core layer 17 of the top mesa 33 (the width of the mesa structure 25). Furthermore, the width of the core-separation layer 19 in the first area 11b is larger than the width of the first core layer 17 of the top mesa 33.

Regarding the etching in step S106, a wet etching is employed. For example, a liquid mixture of sulfuric acid and aqueous hydrogen peroxide is used as an etchant. In the wet etching, newly formed side surfaces of the mesa portion are formed as the etching proceeds. The newly formed side surfaces appeared at the bottom of the top mesa 33. The newly formed side surfaces are not protected by the protective mask 27. Thus, the newly formed mesa structure portion is thus subjected to side etching. The side etching results in the formation of a neck 34 at the bottom of the top mesa 33. The neck 34 is extended along the waveguide axis. The neck 34 is formed in the first area 11b and the second area 11c. In the first portion 11d of the second area 11e where the spot-size convertor is provided, the width of the top mesa 33 is smaller than a waveguide width at which light can propagate in a single mode. The top mesa 33 is coupled to the second core layer 21 with the core-separation layer 19. Thus, the neck 34 at the bottom of the top mesa 33 does not substantially affect the transition of light. The width of the top mesa 33 in the first area 11b is equal to or larger than a waveguide width at which light can propagate in a single mode. Thus, the top mesa 33 stably confine the propagating light. The neck 34 at the bottom of the top mesa 33 in the first area 11b effectively inhibits the leakage of light to the second core layer 21.

After the etching of the bottom portion 17b of the first core layer 17, the protective mask 27 is removed.

The first core layer 17 has a multi-quantum-well (MQW) structure. The multi-quantum-well structure includes quantum well layers made of AlGaInAs and barrier layers made of AlGaInAs alternately stacked. The core-separation layer 19 is composed of InP. The upper face of the second core layer 21 is covered with the core-separation layer 19. According to this method, the core-separation layer 19 is composed of InP; hence, the difference in etching rate between InP and AlGaInAs is used to selectively etch the first core layer 17.

If necessary, a contact opening is formed in the modulation portion of the Mach-Zehnder modulator in step S107. Specifically, after the formation of the top mesa 33, as illustrated in FIG. 11A, a contact mask 35 is formed. The contact mask 35 has an opening 35a above the first area 11b. The opening 35a is located between a first arm waveguide portion 33j and a second arm waveguide portion 33k. The first arm waveguide portion 33j is formed from the first arm mesa structure 25j. The second arm waveguide portion 33k is formed from the second arm mesa structure 25k. The contact mask 35 covers side surfaces and the upper face of the top mesa 33 (33b) on the first area 11b. As illustrated in FIG. 11B, the contact mask 35 covers the side surfaces and the upper face of the top mesa 33 (33c) on the second area 11c. The contact mask 35 covers the surface of the core-separation layer 19 on the second area 11c. The contact mask 35 is formed of, for example, a silicon nitride film. As illustrated in FIG. 11C, the core-separation layer 19 and the second core layer 21 are etched with the contact mask 35. A contact opening 37 is formed by the etching.

The second core layer 21 includes a first portion 21a and a second portion 21b. The second portion 21b of the second core layer 21 is provided between the first portion 21a and the substrate 11. The second portion 21b contains an n-type dopant. The n-type dopant concentration in the second portion 21b is higher than the n-type &pant concentration in the first portion 21a. The n-type dopant concentration in the second portion 21b is, for example, about $1 \times 10^{18}$ $cm^{-3}$. The n-type dopant concentration in the first portion 21a is, for example, about $1 \times 10^{17}$ $cm^{-3}$. Each of the first portion 21a and the second portion 21b of the second core layer 21 has a multi-layer structure including, for example, GaInAsP layers and InP layers alternately stacked. The dopant concentration in the lower region of the multi-layer structure is higher than the dopant concentration in the upper region. The contact opening 37 has a depth DP such that the contact opening 37 communicates with the second core portion 21b. The second portion 21b containing an n-type dopant is exposed through the contact opening 37. To form the opening, for example, dry etching using chlorine gas is employed. After the formation of the contact opening 37, the contact mask 35 is removed. This removal is performed with, for example, buffered hydrofluoric acid (BHF) as an etchant.

Figure 12A:
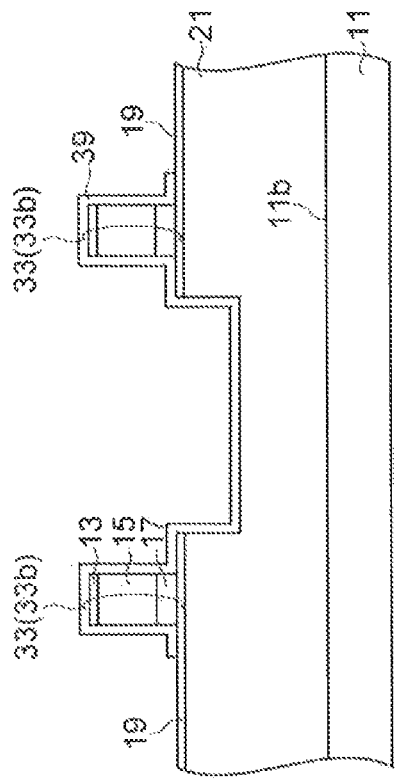
FIGS. 12A, 12B, 12C, and 12D illustrate main steps in the method for producing a spot-size convertor according to the embodiment.
Figure 12B:
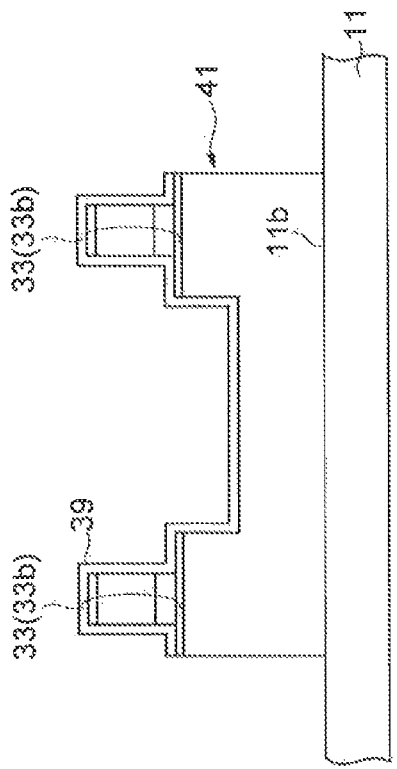

In step S108, in order to form a bottom mesa (a bottom mesa 43 illustrated in FIG. 12C) in the second area 11c, a second mask 39 is formed as illustrated in FIG. 12A. The second mask 39 is an insulating film and formed of for example, a silicon nitride film. The second mask 39 has a strip-shaped pattern with a width DSW larger than the mesa width USW of the top mesa 33. The second mask 39 also has a pattern for the formation of an element-isolation mesa (an element-isolation mesa 41 illustrated in FIG. 12D) in the first area 11b as illustrated in FIG. 12B. According to this method, it is possible to form the element-isolation mesa 41 by the use of the etching for the formation of the bottom mesa 43.

Figure 12C:
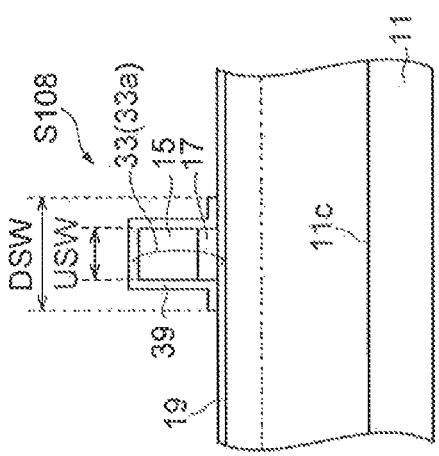
Figure 12D:
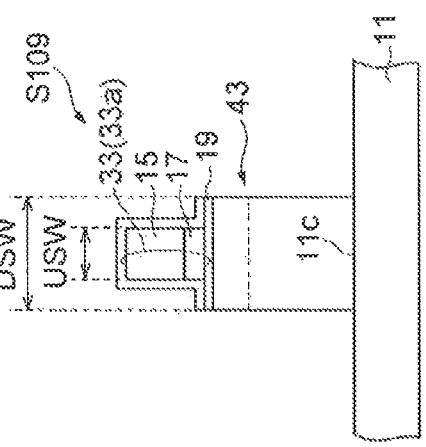

In step S109, the core-separation layer 19 and the second core layer 21 are etched with the second mask 39, thereby forming the bottom mesa 43 on the second area 11c as illustrated in FIGS. 12C and 12D. Furthermore, the element-isolation mesa 41 is formed on the first area 11b. A plurality of active devices may be arranged in the first area 11b of the main surface 11a is electrically isolated by the element isolation mesa 41. After the formation of the bottom mesa 43 and the element-isolation mesa 41, the second mask 39 is removed with, for example, BHF.

The top mesa 33 (33c) includes the cladding layer 15 and first core layer 17. In the second area 11c, the top mesa 33 is located on the bottom mesa 43. The top mesa 33 (33b) includes the contact layer 13, the cladding layer 15, and the first core layer 17. In the first area 11b, the top mesa 33 is located on the element-isolation mesa 41.

The top mesa 33 and the bottom mesa 43 formed through these steps are illustrated in FIGS. 13A to 13D. The top mesa 33 and the bottom mesa 43 in the second area 11c will be described below. FIGS. 13B, 13C, and 13D are cross-sectional views taken along lines VI-VI, VII-VII, and VIII-VIII, in FIG. 13A. FIG. 13A illustrates a waveguide axis Ax and a direction AOUT from the inside of the element toward the facet of the element. The direction AOUT serving as a first direction. FIG. 13A also illustrates a direction AIN from the facet of the element toward the inside of the element. The direction AIN serving as a second direction of the waveguide axis Ax. As illustrated in FIG. 13A, the top mesa 33 includes a portion where the mesa width of the top mesa 33 is gradually reduced in the first direction AOUT. The bottom mesa 43 includes a first portion 43a where the mesa width of the bottom mesa 43 is gradually reduced in the second direction AIN. The bottom mesa 43 further includes a second portion 43b connected to the first portion 43a. The mesa width of the top mesa 33 is gradually reduced in the direction AOUT on the first portion 43a and the second portion 43b. The bottom mesa 43 includes a third portion 43c connected to the second portion 43b. The third portion 43c is a transition portion that connects the bottom mesa 43 to the element-isolation mesa 41. The mesa width of each of the first portion 43a and the third portion 43c is changed in the direction of the waveguide axis Ax. In this embodiment, the mesa width of the second portion 43b is unchanged in the direction of the waveguide axis Ax and is constant. The width of the bottom mesa 43 is, for example, 4.7 to 5.7 µm at the facet of the element. The width of the second portion 43b of the bottom mesa 43 is, for example, 2.4 to 3.0 µm. The proportion of the first portion 43a is about 0.15 with respect to the length of the spot-size convertor. The proportion of the second portion 43b is about 0.75. The proportion of the third portion 43c is about 0.1.

Structures of the bottom mesa 43 and the top mesa 33 in the vertical direction will be described below. The second core layer 21, the core-separation layer 19, the first core layer 17, and the cladding layer 15 are arranged in that order on the principal surface 11a. The second core layer 21 is optically coupled to the first core layer 17 with the core-separation layer 19.

The portion of the top mesa 33 with a width that is gradually reduced enables the transition of the optical mode from the top mesa 33 to the bottom mesa 43 and from the bottom mesa 43 to the top mesa 33.

In the bottom mesa 43 on which the top mesa 33 is not provided, the surface of the second core layer 21 is covered with the core-separation layer 19. That is, the core-separation layer 19 having a lower refractive index than the average refractive index of the second core layer 21 is provided on the second core layer 21. Thus, light propagating through the bottom mesa 43 spreads to not only the second core layer 21 but also the whole of the second core layer 21 and the core-separation layer 19, thereby facilitating the optical coupling between the bottom mesa 43 and the top mesa 33.

In the method for producing a spot-size convertor, as etching in the first half, the cladding layer 15 is etched from the upper face of the stacked semiconductor layer with the first mask 23. Subsequently, the first core layer 17 is etched to the middle of the first core layer 17. The mesa structure 25 is formed on the first area 11b and the second area 11c of the principal surface 11a by the etching in the first half. The mesa structure 25 includes the mesa structure 25 formed by the etching in the first half and the bottom portion 17b of the first core layer 17 to be removed by etching in the second half. The mesa structure 25 is provided on the bottom portion of the first core layer 17. In the etching of the stacked semiconductor layer 10, the etching is performed to the middle of the first core layer 17. Thus, the mesa structure 25 includes a portion of the upper face at which the bottom portion 17b of the first core layer 17 is exposed. The side surfaces of the mesa structure 25 include the side surfaces of the first core layer 17.

After the formation of the protective mask 27 that covers the side surfaces of the mesa structure 25, as etching in the second half, the bottom portion 17b of the first core layer 17 is etched so as to expose the upper face 19a of the core-separation layer 19. After the exposure of the upper face 19a of the core-separation layer 19, the core-separation layer 19 and the second core layer 21 are etched to form the bottom mesa 43.

The width of the core-separation layer 19 in the bottom mesa 43 is larger than the width of the top mesa 33. The optical waveguide formed of the bottom mesa 43 includes the second core layer 21 and the core-separation layer 19. The refractive index of the core-separation layer 19 is smaller than the average refractive index of the first core layer 17 and the average refractive index of the second core layer 21. The core-separation layer 19 is provided between the second core layer 21 of the bottom mesa 43 and the first core layer 17 of the top mesa 33. The core-separation layer 19 extends along the second core layer 21 of the bottom mesa 43 in a region outside the bottom of the top mesa 33.

The optical waveguide included in the bottom mesa 43 is optically coupled to an external optical waveguide (for example, an optical fiber) having a larger mode field diameter than the semiconductor waveguide. The optical waveguide included in the top mesa 33 is optically coupled to the optical waveguide included in the bottom mesa 43 and is optically coupled to an active device (semiconductor element). The core-separation layer 19 extends along the second core layer 21 of the bottom mesa 43 outside the edge of the bottom of the top mesa 33. The core-separation layer 19 is provided on the second core layer 21 of the bottom mesa 43. Thus, light propagating through the optical waveguide included in the bottom mesa 43 spreads to the core-separation layer 19 having a higher refractive index than air. This enables light to spread over the entirety of the bottom mesa 43, compared with a structure in which the core-separation layer 19 is included in the top mesa 33. The core-separation layer 19 is provided on the second core layer 21 of the bottom mesa 43. Thus, light propagating through the optical waveguide included in the bottom mesa 43 spreads to core-separation layer 19, so that light propagation between the optical waveguide included in the bottom mesa 43 and the optical waveguide included in the top mesa 33 proceeds smoothly. Specifically, light propagates from the optical waveguide included in the bottom mesa 43 to the optical waveguide included in the top mesa 33. Furthermore, light propagates from the optical waveguide included in the top mesa 33 to the optical waveguide included in the bottom mesa 43. In transferring the light, the proportion of light that does not transit and remains is reduced.

Figure 14A:
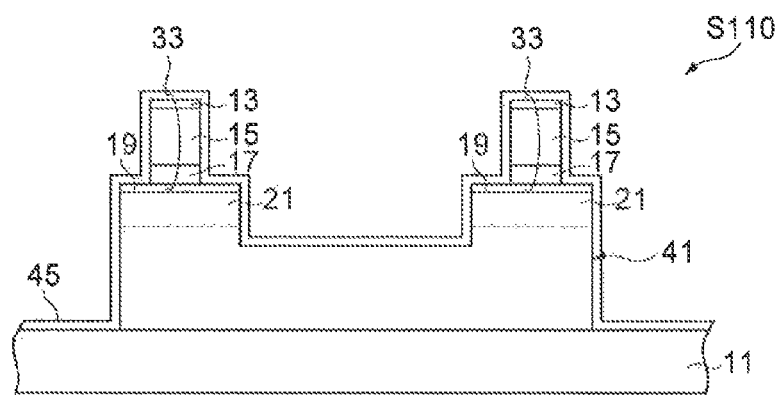
FIGS. 14A and 14B illustrate main steps in the method for producing a spot-size convertor according to the embodiment.
Figure 14B:
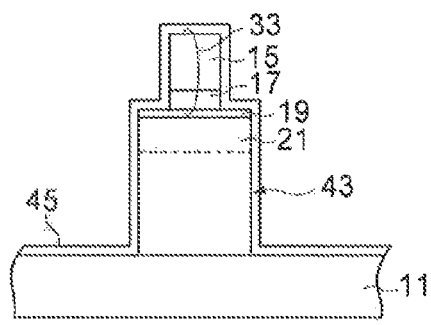

Steps of forming a protective film and electrodes will be described below. In step S110, a protective film 45 is deposited on the entire surface of the substrate 11 as illustrated in FIGS. 14A and 14B. The protective film 45 has a thickness of, for example, 300 nm and is composed of, for example, $SiO_2$. The protective film 45 covers the upper face and the side surfaces of the top mesa 33 configured to form the waveguide of the Mach-Zehnder modulator as illustrated in FIG. 14A. The protective film 45 covers the upper face and the side surfaces of the element-isolation mesa 41. The protective film 45 covers the upper face and the side surfaces of the top mesa 33 of the spot-size convertor as illustrated in FIG. 14B. The protective film 45 covers the upper face and the side surfaces of the bottom mesa 43. The protective film 45 covers the surface of the substrate outside the element-isolation mesa 41 and the bottom mesa 43.

Figure 15A:
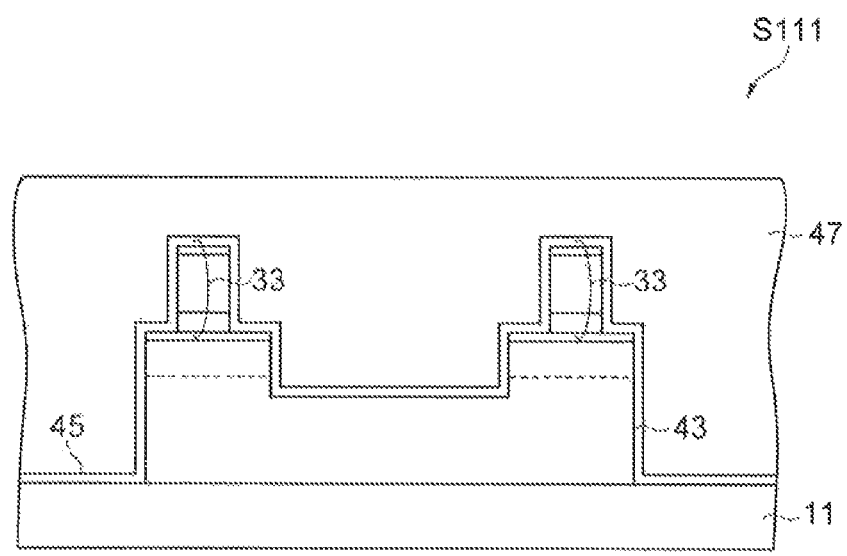
FIGS. 15A and 15B illustrate main steps in the method for producing a spot-size convertor according to the embodiment.
Figure 15B:
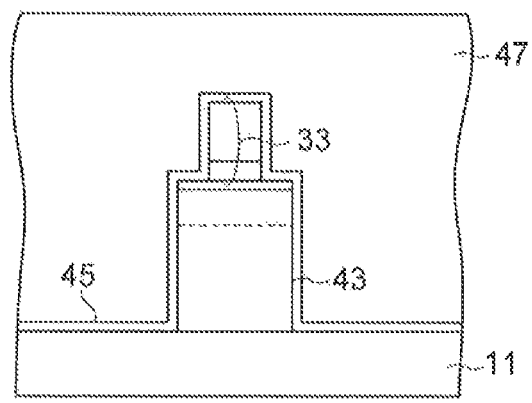

In step S111, a resin film 47 is formed over the entire surface of the substrate 11 as illustrated in FIGS. 15A and 15B. The resin film 47 is composed of, for example, a benzocyclobutene (BCB) resin. The resin film 47 is formed by, for example, spin coating.

Figure 16A:
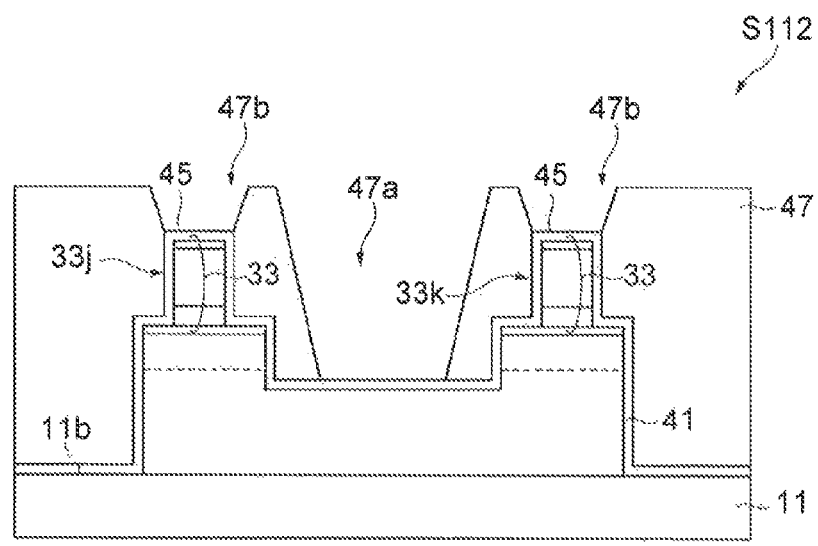
FIGS. 16A and 16B illustrate main steps in the method for producing a spot-size convertor according to the embodiment.
Figure 16B:
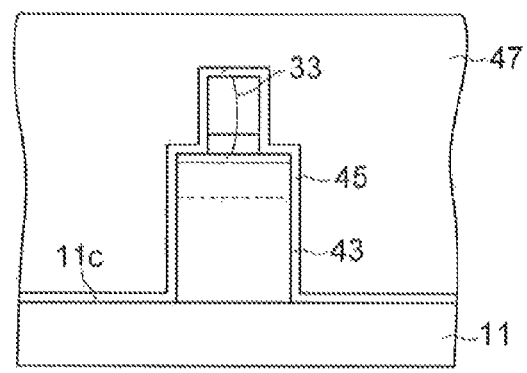

In step S112, openings 47a and 47b configured to form electrodes are formed in the resin film 47 in the first area 11b as illustrated in FIGS. 16A and 16B. As illustrated in FIG. 16A, the opening 47a is formed so as to be matched with the contact opening in the semiconductor region located between the first arm waveguide portion 33j and the second arm waveguide portion 33k. The openings 47b are formed so as to be matched with the upper faces of the first arm waveguide portion 33j and the second arm waveguide portion 33k. The formation of the openings 47a and 47b is performed by photolithography or etching. The protective film 45 is exposed at the openings 47a and 47b. As illustrated in FIG. 16B, an opening is not formed in the resin film 47 in the second area 11c (area for the spot-size convertor).

Figure 17A:
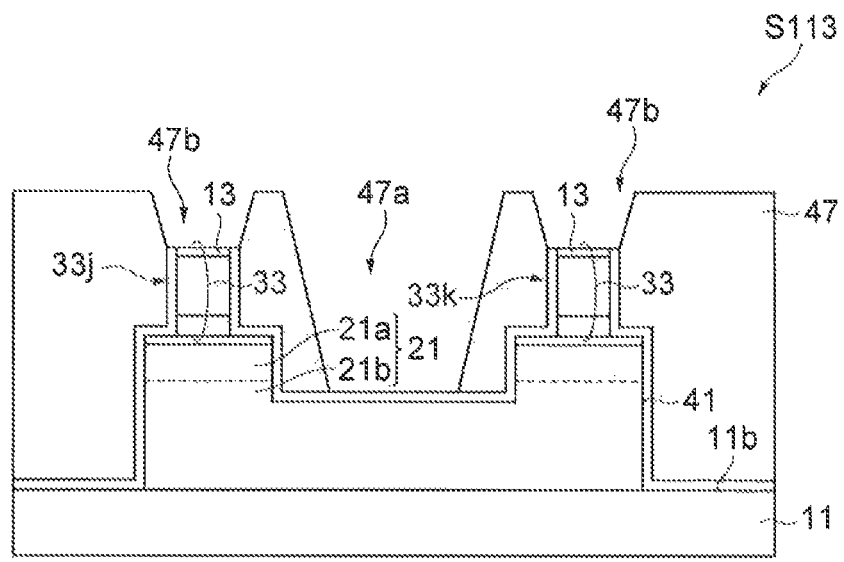
FIGS. 17A and 17B illustrate main steps in the method for producing a spot-size convertor according to the embodiment.
Figure 17B:
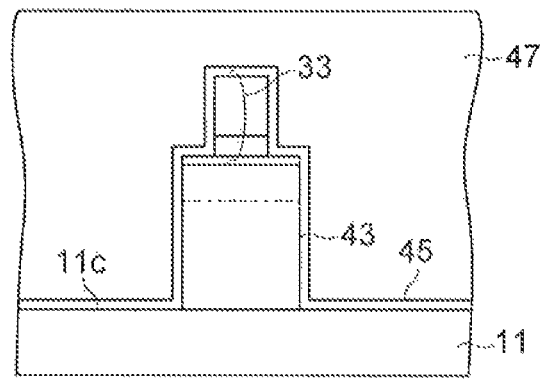

In step S113, portions of the protective film 45 exposed at the openings 47a and 47b are removed as illustrated in FIGS. 17A and 17B. The removal of the portions of the protective film 45 may, be performed by, for example, forming a resist mask and performing dry etching using $CF_4$ gas with the resist mask. As illustrated in FIG. 17A, uppermost semiconductor layers of the first arm waveguide portion 33j, the second arm waveguide portion 33k, and the contact opening are exposed at the openings 47a and 47b. The uppermost semiconductor layers are, for example, the contact layer 13 and the second portion 21b. As illustrated in FIG. 17B, an opening is not formed in the resin film 47 in the second area 11c.

Figure 18A:
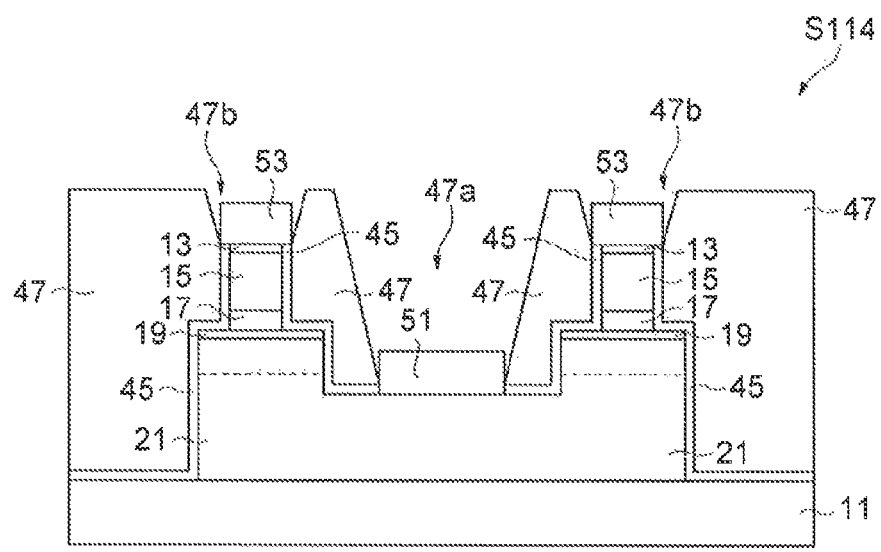
FIGS. 18A and 18B illustrate main steps in the method for producing a spot-size convertor according to the embodiment.
Figure 18B:
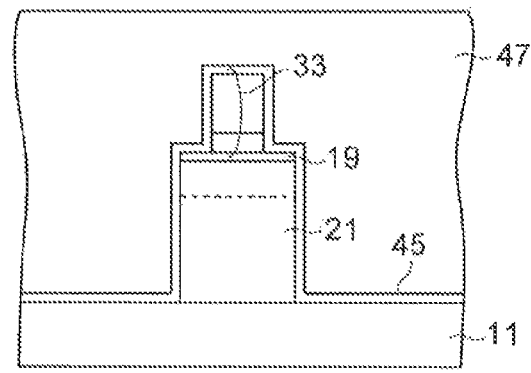

In step S114, a first electrode 51 is formed in the opening 47a as illustrated in FIGS. 18A and 18B. A second electrode 53 is formed in the openings 47b. As illustrated in FIG. 18A, the first electrode 51 serves as, for example, a cathode. The second electrode 53 serves as, for example, an anode. The cathode contains, for example, Au/Ge/Ni. The anode contains, for example, Ti/Pt/Au. As illustrated in FIG. 18B, an electrode is not formed in the second area 11c.

FIGS. 19A to 19D illustrate an example according to this embodiment of the present invention. FIG. 19A illustrates a spot-size convertor according to an example. In this spot-size convertor, the bottom mesa 43 includes the second core layer 21 and the core-separation layer 19. The top mesa 33 includes the first core layer 17 and the cladding layer 15. FIG. 19B illustrates a light distribution at a facet where a waveguide of the spot-size convertor is connected to an external waveguide. FIG. 19C illustrates a light distribution at a middle portion of the waveguide of the spot-size convertor, FIG. 19D illustrates a light distribution at an end portion where the waveguide of the spot-size convertor is connected to an internal semiconductor waveguide (single-mode waveguide).

In the spot-size convertor according to this example, the bottom mesa 43 includes the core-separation layer 19 in addition to the second core layer 21, so that the transition of light proceeds smoothly. In FIG. 19A, light is drawn in such a manner that the spot size of light received from the external waveguide is converted into a spot size for the internal semiconductor waveguide. The spot-size convertor according to this example has a similar effect on light propagating in the opposite direction.

FIGS. 20A to 20D illustrate a spot-size convertor having a different structure from the example according to this embodiment. Referring to FIG. 20A, in this spot-size convertor, a bottom mesa includes a second core layer. A top mesa includes an intermediate layer (core-separation layer), a first core layer, and a cladding layer. FIG. 20B illustrates a light distribution at a facet where a waveguide of the spot-size convertor is connected to an external waveguide. FIG. 20C illustrates a light distribution at a middle portion of the waveguide of the spot-size convertor. FIG. 20D illustrates a light distribution at an end portion where the waveguide of the spot-size convertor is connected to an internal semiconductor waveguide (single-mode waveguide). Broken lines in FIGS. 20B to 20D indicate the light distributions illustrated in FIGS. 19B to 19D for comparison. In this spot-size convertor, the bottom mesa does not include the core-separation layer. Thus, the transition of light does not proceed smoothly, so that part of light received from the external waveguide does not transit smoothly to the internal semiconductor waveguide. As a result, some components of light remain in the bottom mesa. The residual light components result in an optical loss. Regarding the transition of light in the opposite direction, similarly, part of light received from the top mesa of the internal semiconductor waveguide does not transit smoothly to the bottom mesa. As a result, some components of light remain in the top mesa. The residual light components result in an optical loss.

In the spot-size convertor according to this embodiment, etching to form the top mesa is performed in a plurality of stages. As an example, dry etching is employed in the first stage. In the final stage, wet etching is employed. In this wet etching, an etchant capable of selectively etching the first core layer with respect to the core-separation layer is used.

A difference between the spot-size convertor illustrated in FIG. 20A and the spot-size convertor illustrated in FIG. 19A is whether the semiconductor layer located between the two cores is included in the top mesa or the bottom mesa. With respect to other conditions, such as the material, thickness, doping concentration, and dimensions of the semiconductor layer, the models are produced under the same conditions. The light distributions are determined by simulations using these models in the transition direction (Z direction). FIGS. 19B to 19D and FIGS. 20B to 20D illustrate the simulation results of the models.

EXAMPLE

A semiconductor film used for the formation of a Mach-Zehnder modulator including a spot-size convertor (SSC) is formed by epitaxial growth. Organo-metallic vapor phase epitaxy (OMVPE) or the like is employed for the epitaxial growth. First, lower core layers composed of n-type GaIn-AsP/InP, an n-InP buffer layer, a non-doped multi-quantum-well layer (upper core layer) composed of AlGaInAs, a p-type InP cladding layer, and a $p^+$-type GaInAs contact layer are grown on a semi-insulating InP substrate, thereby preparing an epitaxial substrate. A portion of the lower core layers adjacent to the substrate serves as a highly doped layer having a doping concentration of $1 \times 10^{18}$ $cm^{-3}$ or more.

A 300-nm-thick insulating SiN film is deposited by a chemical vapor deposition (CVD) method. A resist pattern including an SSC pattern and a Mach-Zehnder pattern is formed by photolithography. The resist pattern is transferred to an insulating film composed of SiN by reactive ion etching with CF$_4$ gas. The resist pattern is removed by ashing with O$_2$ gas. A semiconductor mesa (upper core) is formed by Cl$_2$-based reactive ion etching with a SiN mask to which the pattern has been transferred. The etching is stopped in the middle of the upper core (AlGaInAs multi-layer quantum well).

Next, a step of leaving an insulating mask on a modulation arm will be described. After a modulation arm region is covered with a resist by photolithography, the SiN mask in a region other than the modulation arm is removed with buffered hydrofluoric acid (BHF). The SiN mask used for the formation of the mesa is left only on the mesa of the modulation arm.

A 400-nm-thick insulating SiN film is deposited by a CVD method on the entire surface of the wafer. The insulating SiN film in the modulation arm region (active waveguide region) is thicker than a passive waveguide region.

An insulating mask is formed on side surfaces of the mesa. The entire surface of the substrate is etched by reactive ion etching (RIE) with CF$_4$ gas. In this etching, a resist mask is not used. In this etching, a pattern is formed by the use of the difference in thickness between the insulating SiN films. The amount of the insulating SiN films etched is controlled by, for example, the etching time. This etching results in the formation of a mask pattern such that the insulating SiN film is left on the side surfaces of the mesa and the SiN film is also left on the side surfaces of the passive waveguide region. This etching results in the exposure of a surface in the middle of the upper core layer.

The contact layer and the remaining upper core layer are removed. The GaInAs contact layer and the bottom portion of the upper core layer including the multi-quantum-well layer composed of AlGaInAs are removed by wet etching with a sulfuric acid-containing etchant. InP functions as an etch-stop layer at the time of this wet etching. Thereby, the remaining upper core layer is removed. Finally, the entire insulating SiN mask is removed with buffered hydrofluoric acid.

The highly doped n-type semiconductor layer is exposed. A SiN film having a thickness of 300 nm is deposited by a CVD method. A resist pattern having an opening at the central portion of the Mach-Zehnder strip is formed by photolithography. The resist pattern is transferred to the SiN film by reactive ion etching with CF$_4$ gas. After the formation of the SiN film to which the pattern has been transferred, the resist pattern is removed by aching using oxygen plasma. The semiconductor layer is etched by Cl$_2$-based reactive ion etching with the resulting SiN mask pattern as an etching mask. This etching results in the exposure of the highly doped n-type semiconductor layer in the middle portion of the Mach-Zehnder strip. The passive waveguide region is covered with the SiN film; hence, the highly doped n-type semiconductor layer is not exposed. The SiN mask pattern is removed with BHF.

A bottom mesa and an element-isolation mesa are formed. A 300-nm-thick SiN film is deposited by a CVD method. A resist pattern having a pattern for the element-isolation mesa and a pattern for the bottom mesa is formed by photolithography. The resist pattern is transferred to a SiN film by reactive ion etching with CF$_4$ gas. After the formation of the SiN film to which the pattern has been transferred, the resist pattern is removed with oxygen plasma. The semiconductor layer is etched by Cl$_2$-based reactive ion etching with the SiN film as an etching mask. This etching results in the formation of the element-isolation mesa and the bottom mesa. The SiN film is removed with BHF.

A protective SiO$_2$ film is formed, and then BCB burying is performed. A 300-nm-thick SiO$_2$ film serving as a protective film for the mesa is deposited by a CVD method. A benzocyclobutene (BCB) resin is applied by spin coating.

An opening pattern is formed in the BCB resin. A resist pattern is formed on the BCB resin by photolithography. Openings are formed in the BCB resin by reactive ion etching using a gas mixture of CF$_4$ gas and O$_2$ gas with the resist pattern serving as a mask. The openings are formed on the p-side region and the n-side region in that order. Preferably, the opening on the n-side region, in which a relatively large step height of the opening is provided, is formed after the formation of the opening in the p-side region. The resist pattern is removed with an organic solvent.

An opening pattern to remove the protective SiO$_2$ film in the contact opening is formed. The protective SiO$_2$ film on the contact layer in the p-side region and the n-side region is removed by reactive ion etching with CF$_4$ gas.

Ohmic electrodes are formed. The ohmic electrodes are formed in the respective openings formed in the p-side region and the n-side region by vapor deposition and a lift-off method. Annealing of the electrodes, the formation of an Au-plating layer, and the processing of the back surface of the substrate are performed in that order.

The present invention is not limited to the specific structures disclosed in the example and the embodiment.

What is claimed is:

1. A method for producing a spot-size convertor, comprising the steps of:
    preparing a substrate having a principal surface including a first area and a second area;
    forming a stacked semiconductor layer on the principal surface of the substrate, the stacked semiconductor layer including a cladding layer, a first core layer, a core-separation layer, and a second core layer;
    forming a first mask on the stacked semiconductor layer;
    forming a mesa structure on the first area and the second area by etching the stacked semiconductor layer from an upper face of the stacked semiconductor layer to a middle of the first core layer using the first mask as an etching mask, the mesa structure including a side surface and a bottom portion of the first core layer, the mesa structure extending along a waveguide axis;
    forming a protective mask covering the side surface of the mesa structure;
    etching the bottom portion of the first core layer using the protective mask to form a top mesa until an upper surface of the core-separation layer is exposed;
    forming a second mask having a stripe-shaped pattern with a larger width than a mesa width of the top mesa; and
    forming a bottom mesa on the second area by etching the core-separation layer and the second core layer using the second mask,
    wherein, in the second area, the top mesa is located on the bottom mesa,
    the top mesa includes the cladding layer, the first core layer, and a portion having the mesa width gradually reduced in a first direction of the waveguide axis, and
    the bottom mesa includes the core-separation layer, the second core layer, and a portion having a mesa width gradually reduced in a second direction opposite to the first direction of the waveguide axis.

2. The method according to claim 1, wherein
    the stacked semiconductor layer includes a contact layer formed on the cladding layer,
    the step of forming the protective mask includes the steps of
    after the formation of the mesa structure, forming a resist mask having a pattern covering the first mask in the first area of the principal surface, the first mask in the second area of the principal surface being exposed through the resist mask;

etching the first mask using the resist mask, the first mask on the mesa structure in the first area being left;

after the etching of the first mask, forming an insulating film having a first thickness on the mesa structure, the side surface of the mesa structure, and the bottom portion of the first core layer;

etching the insulating film by dry etching so as to form the protective mask disposed on the side surface of the mesa structure, and in the step of etching the bottom portion of the first core layer, the contact layer of the top mesa on the second area of the principal surface is etched.

3. The method according to claim 2,
wherein, in the step of etching the insulating film by dry etching, the insulating film is etched using an etchant containing fluorocarbon.

4. The method according to claim 1,
wherein the second core layer has a multi-layer structure including GaInAsP layers and InP layers alternately stacked,
the second core layer includes a first portion and a second portion provided between the first portion and the substrate, and
the second portion of the second core layer is doped with an n-type dopant, 5. The method according to claim 1,
wherein the top mesa on the first area is configured to form a modulation portion as a Mach-Zehnder modulator, and
the modulation portion includes a first arm waveguide and a second arm waveguide of the Mach-Zehnder modulator.

6. The method according to claim 5,
wherein the second core layer has a multi-layer structure including GaInAsP layers and InP layers alternately stacked,
the second core layer includes a first portion and a second portion provided between the first portion and the substrate, and
the second portion of the second core layer is doped with an n-type dopant, and
wherein the method further comprises the steps of:
after the formation of the top mesa, forming a contact mask having an opening located between the first arm waveguide and the second arm waveguide on the first area of the principal surface of the substrate;
forming a contact opening by etching the first portion of the second core layer and the core-separation layer using the contact mask; and
forming a first electrode located on the top mesa on the first area and a second electrode located in the contact opening.

7. The method according to claim 1,
wherein the step of forming the bottom mesa on the second area includes a step of forming an element-isolation mesa in the first area at the time of the etching of the second core layer.

8. The method according to claim 1,
wherein the first core layer has a multi-quantum-well structure including quantum well layers made of AlGaInAs and barrier layers made of AlGaInAs alternately stacked,
the core-separation layer is made of InP, and
the core-separation layer covers an upper face of the second core layer of the bottom mesa.

* * * * *